United States Patent
Brassitos et al.

(10) Patent No.: US 10,174,810 B2
(45) Date of Patent: Jan. 8, 2019

(54) CURVED BEARING CONTACT SYSTEM

(71) Applicant: Northeastern University, Boston, MA (US)

(72) Inventors: Elias Brassitos, Boston, MA (US); Brian Weinberg, San Diego, CA (US); Qingchao Kong, Revere, MA (US); Constantinos Mavroidis, Arlington, MA (US)

(73) Assignee: Northeastern University, Boston, MA (US)

( * ) Notice: Subject to any disclaimer, the term of this patent is extended or adjusted under 35 U.S.C. 154(b) by 324 days.

(21) Appl. No.: 14/779,272

(22) PCT Filed: Mar. 24, 2014

(86) PCT No.: PCT/US2014/031566
§ 371 (c)(1),
(2) Date: Sep. 22, 2015

(87) PCT Pub. No.: WO2014/153556
PCT Pub. Date: Sep. 25, 2014

(65) Prior Publication Data
US 2016/0053858 A1    Feb. 25, 2016

Related U.S. Application Data

(60) Provisional application No. 61/913,635, filed on Dec. 9, 2013, provisional application No. 61/804,256, filed on Mar. 22, 2013.

(51) Int. Cl.
*F16H 1/28* (2006.01)
*F16H 57/02* (2012.01)
(Continued)

(52) U.S. Cl.
CPC ............... *F16H 1/28* (2013.01); *F16H 1/46* (2013.01); *F16H 57/02004* (2013.01);
(Continued)

(58) Field of Classification Search
CPC ...... F16H 1/28; F16H 57/021; F16H 57/0479; F16H 2057/085; F16H 13/06; F16C 13/02; F16C 17/10; H02K 7/116; H02K 21/22
See application file for complete search history.

(56) References Cited

U.S. PATENT DOCUMENTS 1,737,997 A * 12/1929 Garrard .................. F16H 13/06
475/183
3,206,993 A    9/1965 Niemann
(Continued)

FOREIGN PATENT DOCUMENTS

DE    10161942 A1    7/2003
EP    1493947 A1    1/2005
(Continued)

OTHER PUBLICATIONS

Dontyne Systems, "Planetary Gear Design Software," 2 pages (2012); retrieved from Url:<http://www.dontynesystems.com/uploads/file_upload/Planetary_v10.pdf> (retrieved on Jul. 25, 2014).
(Continued)

*Primary Examiner* — Stacey A Fluhart

(57) ABSTRACT

In some embodiments, systems and methods are described for a gear contact system configured to support radial, thrust, and moment loads, the system comprising a first gear comprising a first roller having a first roller bearing surface, the first roller bearing surface having a convex curvature defined by a first radius of curvature; and a second gear comprising a second roller having a second roller bearing
(Continued)

surface, the second roller bearing surface having a concave curvature defined by a second radius of curvature.

15 Claims, 24 Drawing Sheets

(51) Int. Cl.
*F16H 1/46* (2006.01)
*H02K 21/22* (2006.01)
*H02K 7/116* (2006.01)
*F16H 57/00* (2012.01)

(52) U.S. Cl.
CPC .............. *H02K 7/116* (2013.01); *H02K 21/22* (2013.01); *F16H 2001/2872* (2013.01); *F16H 2057/0087* (2013.01)

(56) References Cited

U.S. PATENT DOCUMENTS

| | | | |
|---|---|---|---|
| 5,021,035 A * | 6/1991 | Zhou | F16H 13/06 475/183 |
| 5,597,589 A | 1/1997 | Deckard | |
| 5,647,723 A | 7/1997 | Rush | |
| 5,679,087 A | 10/1997 | Lutz | |
| 5,851,162 A | 12/1998 | Tether | |
| 6,394,924 B1 | 5/2002 | Schiebold et al. | |
| 6,423,099 B1 | 7/2002 | Iversen et al. | |
| 6,626,792 B2 | 9/2003 | Vranish | |
| 7,014,586 B2 | 3/2006 | Randall | |
| 7,276,009 B2 | 10/2007 | Bornchen et al. | |
| 7,334,558 B2 | 2/2008 | Higgins | |
| 8,016,893 B2 | 9/2011 | Weinberg et al. | |
| 9,458,885 B2 * | 10/2016 | Ishii | F16C 13/02 |
| 2002/0007691 A1 | 1/2002 | Peter | |
| 2004/0053740 A1 | 3/2004 | Wodtke | |
| 2005/0204850 A1 | 9/2005 | Nihei et al. | |
| 2006/0073933 A1 | 4/2006 | Vranish | |
| 2006/0152104 A1 * | 7/2006 | Hino | H02K 21/028 310/268 |
| 2006/0219039 A1 | 10/2006 | Vranish | |
| 2006/0264296 A1 | 11/2006 | Moeller | |
| 2007/0149335 A1 | 6/2007 | Strauss et al. | |
| 2008/0070736 A1 | 3/2008 | Yoshino et al. | |
| 2008/0288088 A1 | 11/2008 | Langenfeld et al. | |

FOREIGN PATENT DOCUMENTS

| | | |
|---|---|---|
| EP | 1547568 A1 | 6/2005 |
| WO | WO-98/22734 A1 | 5/1998 |
| WO | WO-2006/102590 A1 | 9/2006 |

OTHER PUBLICATIONS

International Search Report and Written Opinion issued by the U.S. Patent and Trademark Office as International Searching Authority for International Application No. PCT/US2014/031566 dated Aug. 19, 2014 (9 pages).

Sharke, Paul, "The Start of a New Movement," Feature Article, 6 pages (Aug. 2002), retrieved from Url:<https://web.archive.org/web/20030106193954/http://www.memagazine.org/backissues/aug02/features/startnew/startnew.html> (retrieved on Jan. 12, 2016).

ZAR5, "Software for Planetary Gearing Design," Hexagon Software, 10 pages (2011); retrieved from Url:<https://web.archive.org/web/20120618151547/http://www.hexagon.de/zar5_e.htm> (retrieved on Jul. 25, 2014).

Supplementary Partial European Search Report, EP Application No. EP 14770930, dated Aug. 29, 2017, 11 pages.

* cited by examiner

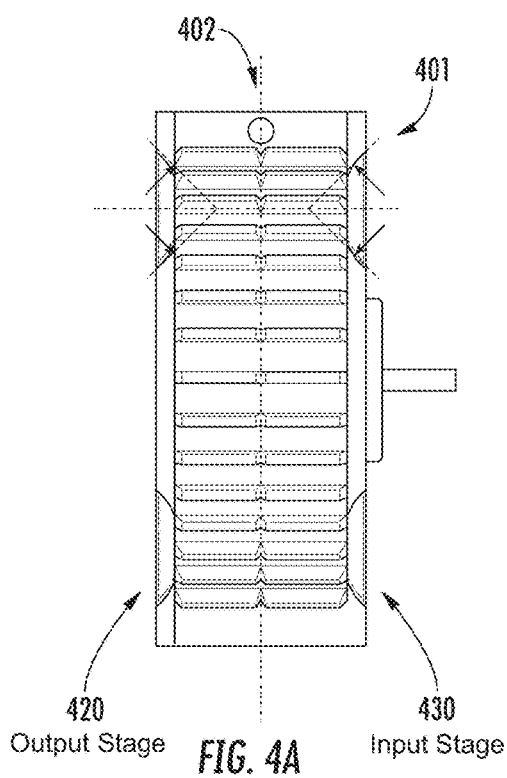
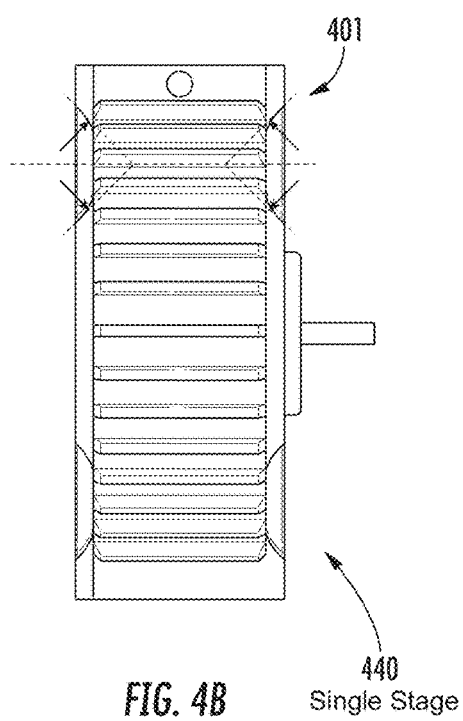
FIG. 4A  420 Output Stage  430 Input Stage
FIG. 4B  440 Single Stage

| Operating Mode | Input Stage | | Output Stage | | Applications |
|---|---|---|---|---|---|
| | Sun | Ring | Sun | Ring | |
| Inrunner/Outrunner [GBD] | Driving | Fixed | Idle | Driven | High speed reducers |
| Inrunner/Inrunner | Driving | Fixed | Driven | Idle | Low speed reducers. Speed increasers |
| Outrunner/Outrunner | Fixed | Driving | Idle | Driven | Low speed reducers. Speed increasers |
| Outrunner/Inrunner | Fixed | Driving | Driven | Idle | High speed reducers |

FIG. 12

| Gear Ratio | $R$ | $R$ (Floating variable) |
|---|---|---|
| Input Sun Teeth | $N_1$ | $N_1$ (Floating variable) |
| Input Planet Teeth | $N_2$ | $N_2$ (Floating variable) |
| Input Ring Teeth | $N_3$ | $N_1 + N_2$ |
| Output Planet Teeth (minimum optimal) | $N_4$ | $GCF[RN_1N_2 - 2N_2(N_1 + N_2), RN_1(N_1 + 2N_2)]$ |
| Output Ring Teeth (minimum optimal) | $N_5$ | $RN_1(N_1 + 2N_2)$ / $GCF[RN_1N_2 - 2N_2(N_1 + N_2), RN_1(N_1 + 2N_2)]$ |
| Input Sun Diameter | $D_1$ | $D_1$ (Floating variable) |
| Input Stage Diameteral Pitch | $P_1$ | $\frac{N_1}{D_1}$ |
| Output Stage Diameteral Pitch | $P_1$ | $P_1\left(\frac{N_5 - N_4}{N_1 + N_2}\right)$ |
| Input Planet Diameter | $D_2$ | $\frac{N_2}{P_1}$ |
| Input Gear Diameter | $D_3$ | $\frac{N_3}{P_1}$ |
| Output Planet Diameter | $D_4$ | $\frac{N_4}{P_1}$ |
| Output Gear Diameter | $D_5$ | $\frac{N_5}{P_1}$ |

FIG. 13

| Gear | Number of Teeth | Pitch Diameter [in] | Diametral Pitch |
|---|---|---|---|
| Stage 1 Ground Ring | 95 | 2.5 | 38 |
| Stage 1 Sun Gear | 57 | 1.5 | 38 |
| Stage 1 Pinions | 19 | 0.5 | 38 |
| Stage 2 Pinions | 20 | 0.506 | 39.5 |
| Stage 2 Output Ring | 99 | 2.506 | 39.5 |

FIG. 16

| | |
|---|---|
| Gear Bearing Gear Ratio | 264:1 |
| Total Diameter | 76.2 mm (3 in) |
| Total Length | 41.2 mm (1.65 in) |
| Input Power Max | 110 W |
| Output Power (85% efficiency) | 94 W |
| Output Torque | 26 Nm |
| Output Speed | 23 rpm nominal |
| Input Voltage | 13.8 V |

FIG. 18

CURVED BEARING CONTACT SYSTEM

CROSS REFERENCE TO RELATED APPLICATIONS

This application claims benefit under 35 U.S.C. § 119(e) of U.S. Provisional Application No. 61/804,256, filed Mar. 22, 2013, the disclosure of which is incorporated by reference herein.

This application also claims benefit under 35 U.S.C. § 119(e) of U.S. Provisional Application No. 61/913,635, filed Dec. 9, 2013, the disclosure of which is incorporated by reference herein.

This application is related to U.S. application Ser. No. 11/821,095, entitled "Gear Bearing Drive," filed Jun. 21, 2007, which issued as U.S. Pat. No. 8,016,893, the disclosure of which is incorporated by reference herein.

U.S. application Ser. No. 11/821,095 claims benefit under 35 U.S.C. § 119(e) of U.S. Provisional Application No. 60/815,313, filed Jun. 21, 2006, the disclosure of which is incorporated by reference herein.

STATEMENT OF INCORPORATION BY REFERENCE

All patents, patent applications and publications cited herein are hereby incorporated by reference in their entirety in order to more fully describe the state of the art as known to those skilled therein as of the date of the invention described herein.

TECHNICAL FIELD OF THE INVENTION

This invention relates to a curved bearing contact system and its use in a variety of systems, including a planetary gear system and a gear bearing drive.

BACKGROUND OF THE INVENTION

In designing advanced compact actuators, there is a need for miniaturized devices and instruments that can apply substantial forces. Actuator requirements are becoming more stringent in terms of mass, dimensions, power and cost. Improvements in actuator robustness and reliability associated with power efficiency and compact packaging can lead to effective devices that are significantly more capable and reliable at a lower cost.

The development of high performance and efficient powertrains (actuator and transmission) can be necessary to meet the radical design requirements of demanding next generation robotic systems, particularly in space robotics where weight, efficiency and compact forms are decisive for the application functionality (e.g., space manipulator joints, powered bionics, humanoid manipulators, and space exercise devices for astronauts). Such robotic applications require a new breed of actuators that have compact, configurable hardware and inherent mechanical compatibility and adaptability to robotic manipulation.

Previously, actuators have been dominated by the Harmonic Drives, which offer compact mechanisms with high-speed reductions. During the past 30 years, the use of Harmonic Drive transmissions in conjunction with high performance electric motors has been the state of the art for actuated joints in robotics. Harmonic Drives are primarily useful to develop compact, high torque outputs actuators. These actuated joints can have little to no backlash and require only a one-time dry lubrication, making them ideal for a wide variety of applications. The principle of operation of Harmonic Drives is based on a unique type of transmission mechanism comprising three concentric components, denoted by the Wave Generator, Flexpline, and Circular Spline. The Wave Generator consists of a bearing that is press fitted within an elliptically shaped steel disk and inserted within the Flexpline. The Flexpline is a compliant thin-walled steel cup that conforms to the shape of the wave generator, and has teeth on its external diameter that mates with the Circular Spline. The Circular Spline consists of a rigid steel ring with teeth on the internal diameter and represents the output. Harmonic Drives are designed such that the Flexpline has two teeth less than the Circular Spline, so that when the Wave Plug rotates one revolution, the Circular Spline is shifted by two teeth yielding very high torque advantages. However research on Harmonic Drives has shown that it can exhibit large non-linear behavior under high dynamic loads due to its flexible gear component being in series inside the transmission. This elastic element creates a low stiffness medium inside the transmission, which deforms under load in a way similar to backlash. The elastic component also introduces instabilities under high gain feedback loops that further deteriorate the control system performance of the actuated joint. Additionally, Harmonic Drives are only transmission systems and require specialty motors to perform as actuators.

Several other actuator systems involving high performance brushless motors in combination with high gear-ratio planetary gearheads have been used in an attempt to reduce size, cost and manufacturing complexity. Overall, most of these actuators are still too large because the motor is connected serially to the planetary gearbox and not integrated within the gearbox. Some work has been performed to reduce the size of the assembly of the serially connected brushless DC motor and of the planetary gears. For example, a compact inner rotor slotless brushless DC motor serially connected to a single stage planetary gearheads has been developed. However, the resultant actuator can only exhibit low-reduction ratio at 1/5 and lacks the ability to generate high amount of torque that is often desired in robotics. Another example is a slotless type brushless DC motor that is integrated with a planetary gearhead to function as a robotic actuator. The system attempts to reduce the cogging of the brushless DC motor by optimizing the number of gear teeth integrated on the stator and tooth-to-pole ratio. Efficiencies of 80 to 85% have been realized for 90 W of power output, and the backlash ranged from 50 to 20 arc-min. A major limitation of these devices has been the inability to generate high amount of torque larger than 20 Nm that is often desired in robotics, and exhibited relative higher backlash compared to Harmonic Drives.

SUMMARY

In some embodiments, systems and methods are described for a gear contact system configured to support radial, thrust, and moment loads, the system comprising a first gear comprising a first roller having a first roller bearing surface, the first roller bearing surface having a convex curvature defined by a first radius of curvature; and a second gear comprising a second roller having a second roller bearing surface, the second roller bearing surface having a concave curvature defined by a second radius of curvature, wherein the second radius of curvature is larger than the first radius of curvature, the second roller bearing surface of the second roller mating with the first roller bearing surface of the first roller at the pitch diameter of the two gears at at least a point, such that a line tangent to the point is at an angle with respect to the rotation axis of the first gear. In some embodiments, the angle is between 0 and 90 degrees. In some embodiments, the angle is between 30 and 60 degrees. In some embodiments, the angle is between 40 and 50 degrees. In some embodiments, the angle is between 30 and 60 degrees. In some embodiments, the angle is 45 degrees. In some embodiments, the roller bearing surfaces comprise a material capable of supporting high speed contact. In some embodiments, the material comprises at least one of AMPCO 45 bronze, stainless steel or Nitronic steel. In some embodiments, the first radius of curvature, the second radius of curvature and the angle are selected such that the first roller bearing surface and the second roller bearing surface wear evenly. In some embodiments, the gear contact system is used in a planetary gear system having at least sun gear, at least two planet gears, and at least one ring gear. In some embodiments, the gear contact system is used in a planetary gear system having an input stage assembly comprising an input sun gear, at least one input planet gear, and an input ring gear; and at least one output stage assembly comprising an output planet gear, the at least one output planet gear coupled to the at least one input gear, and an output ring gear. In some embodiments, a method is described for using the gear contact system wherein radial, thrust, and moment loads are stabilized.

In some embodiments, the at least one output stage assembly further comprises an output sun gear and the input stage assembly further comprises a motor having an external rotor disposed inside an interior region of the input sun gear. In some embodiments, the motor drives the input sun gear, the input ring gear is fixed, the output sun gear is idle, and the output ring gear is driven by the input sun gear. In some embodiments, the motor drives the input sun gear, the input ring gear is fixed, the output sun gear is driven by the input sun gear, and the output ring is idle. In some embodiments, the motor drives the input ring gear, the input sun gear is fixed, the output sun gear is driven by the input ring gear, and the output ring is idle. In some embodiments, the motor drives the input ring gear, the input sun gear is fixed, the output sun gear is idle, and the output ring is driven by the input ring gear. In some embodiments, a ball bearing raceway is grooved between the input stage and the output stage at the interface between the input sun gear and output sun gear. In some embodiments, the couple between the at least one input planet gear and the at least one output planet gear is pre-stressed. In some embodiments, a ball bearing raceway grooved between the input stage and the output stage at the interface between the input ring gear and output ring gear. In some embodiments, a carrier is configured to keep one input planet gear parallel with at least one other input planet gear on a radial plane perpendicular to the axis of rotation when the planetary gear system is subjected to high external loads. In some embodiments, a carrier is configured to keep one output planet gear parallel with at least one other output planet gear on a radial plane perpendicular to the axis of rotation when the planetary gear system is subjected to high external loads.

In some embodiments, systems and methods are described for producing a planetary gear system having an input sun gear, an output sun gear, at least one input planet gear, at least one output planet gear, an input ring gear, and an output ring gear, each gear comprising a number of teeth, the gear bearing drive configured to output torque and speed. In some embodiments, the method comprises receiving, at a user interface, inputs including at least one of a range of teeth on an input sun gear, a range of desired gear ratios, and a range of a number of teeth on a planet gear, and a maximum torque and speed output; calculating, at a processor configured to store and execute computer readable instructions, parameters of a planetary gear system having a greatest common factor between a number of teeth in at least one output planet and one output ring using combinations of at least one of the range of teeth on an input sun gear, the range of desired gear ratios, and the range of a number of teeth on a planet gear; and the maximum torque and speed output; transmitting to an image generator the parameters of the planetary gear system, the image generator capable of generating an image of the planetary gear system; transmitting to an additive manufacturing device the image of the planetary gear system, the additive manufacturing device capable of producing a physical copy of the planetary gear system based on the image of the planetary gear system.

In some embodiments, an apparatus is described comprising a user interface configured to receive inputs including at least one of: a range of teeth on an input sun gear, a range of desired gear ratios, and a range of a number of teeth on a planet gear, and a maximum torque and speed output; a design module operably connected to the user interface, comprising processors and memory thereon for the storage of executable instructions and data, wherein the instructions are executed to calculate parameters of a planetary gear system having a greatest common factor between a number of teeth in at least one output planet and one output ring using combinations of at least one of the range of teeth on an input sun gear, the range of desired gear ratios, and the range of a number of teeth on a planet gear; and the maximum torque and speed output; and a transmission module operably connected to the design module, configured to transmit to an image generator the parameters of the planetary gear system, the image generator capable of generating an image of the planetary gear system; and transmit to an additive manufacturing device the image of the planetary gear system, the additive manufacturing device capable of producing a physical copy of the planetary gear system based on the image of the planetary gear system.

BRIEF DESCRIPTION OF THE DRAWINGS

FIG. 4A illustrates force balance on a multistage planets subassembly, as described in some embodiments of the present disclosure.

FIG. 4B illustrates force balance on a single stage planets subassembly, as described in some embodiments of the present disclosure.

FIG. 12 illustrates in tabular form the status of the sun and ring gears in the four different inrunner-outrunner combinations, as described in some embodiments of the present disclosure.

FIG. 13 illustrates a summary of the kinematic relationships of the Gear Bearing Drive, as described in some embodiments of the present disclosure.

FIG. 16 illustrates the specifications of the Gear Bearing Drive design for the elbow prosthesis described in FIG. 14, as described in some embodiments of the present disclosure.

FIG. 18 illustrates the results from the dynamometer testing in FIG. 17, as described in some embodiments of the present disclosure.

DESCRIPTION

To reduce the size, cost, and manufacturing complexity of robotic actuators and other gearboxes, there is a need for an approach that both reduces the overall complexity of a gear assembly and provides for greater stability. In some aspects, the systems and methods described herein provide a dual function approach for mechanical components that eliminates the need for fasteners, ball bearings, and at the same time provides support for radial, thrust, and moment loads. In some aspects, the systems and computer implemented methods described herein relate to eliminating noise and premature failure, reducing trial and error, and lowering design and overall manufacturing costs.

In some aspects, the systems and methods described herein can be implemented in a Gear Bearing Drive (GBD), as described in U.S. Pat. No. 8,016,893, entitled "Gear Bearing Drive," the contents of which are incorporated by reference. In some aspects, the systems and methods described herein provide different modes of operation of a GBD.

Other aspects to the systems and methods described herein include: 1) performing low and high speed reduction efficiently; 2) maintaining gear-set alignment without the usage of traditional ball bearings and planets carriers; 3) enabling the placement of the motor within the gearbox to reduce the total volume of the actuator; 4) simplifying the assembly process; and 5) producing an overall low-cost solution that does not require traditional ball bearings, planet carrier, external fasteners, and complex assembling.

Curved Contact Surfaces

In some embodiments, the invention utilizes curved contact surfaces mounted parallel in an axial direction to gear components to establish gear-set alignment and to secure the assembly in the longitudinal and lateral directions. In one aspect, a roller assembly is provided that provides gear-set alignment and secures the gear assembly in the longitudinal and lateral directions.

In some instances, the roller surface forms a truncated spherical surface in which the smaller circular surface is directed towards the gear face, e.g., the angled surface deviates at a positive angle. In some instances, the roller surface forms a truncated spherical surface in which the smaller circular surface is directed away from the gear face, e.g., the angled surface deviates at a negative angle. The angled roller surface provides angular contact surfaces associated with each gear and the angular contact surfaces of neighboring gears are selected such that a roller with an angled surface that deviates at a positive angle is adjacent to a roller with an angled surface that deviates at a negative angle. The angled roller surface provides angular contact surfaces having a diameter equal to the pitch diameter of the associated gear at the contact point.

Figure 23:
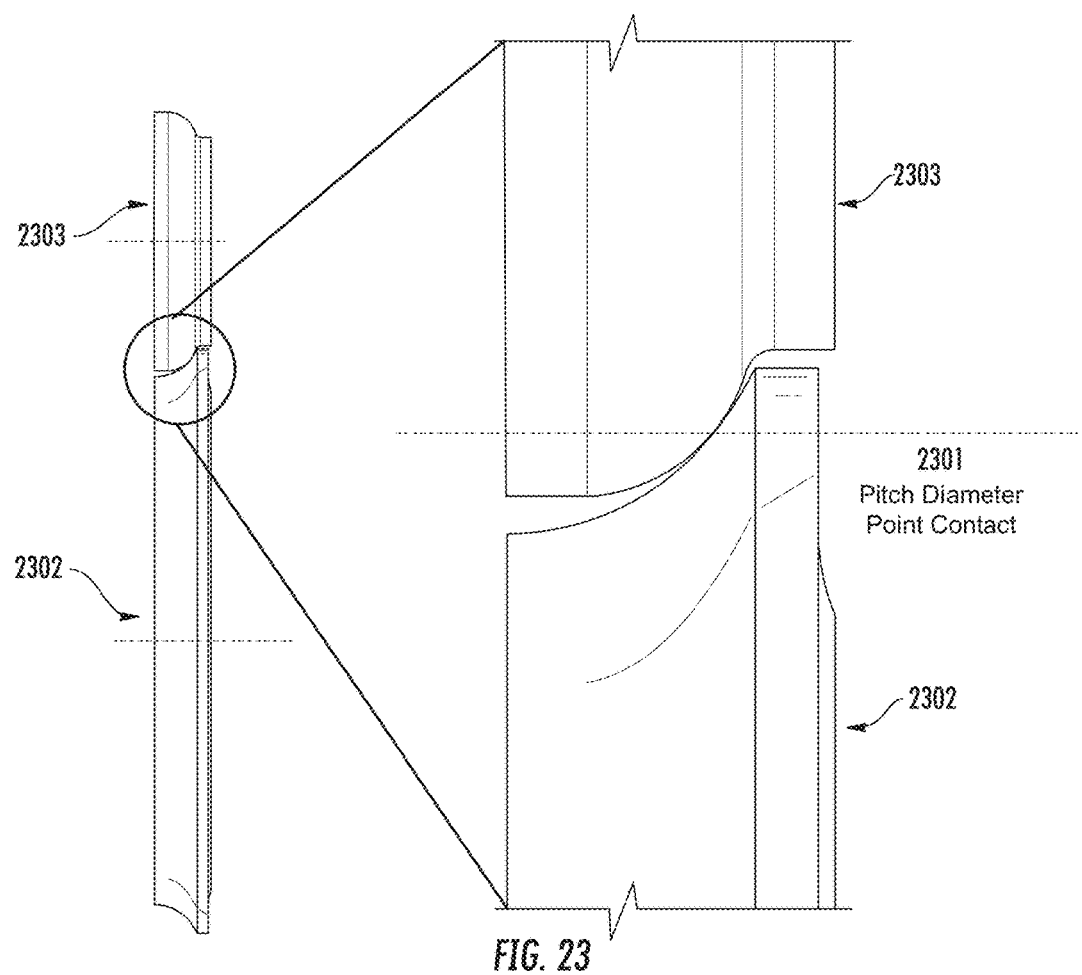
FIG. 23 illustrates curved roller bearings, as described in some embodiments of the present disclosure.

FIG. 23 illustrates curved roller bearings, as described in some embodiments of the present disclosure. FIG. 23 illustrates two curved roller surfaces that meet at a pitch diameter point contact 2301. The curved roller surface corresponding to the bottom roller 2302 has an angled surface deviating at a negative angle. The curved roller surface corresponding to the upper roller 2303 has an angled surface deviating at a positive angle.

In some embodiments, the point at which the two curved roller surface meet corresponds to a point tangent to the curvatures of both rollers. The curvature of the roller contact surfaces can be defined by two tangent circles. In some embodiments, one of the rollers has a convex curvature proportional to the reciprocal of the radius of a first circle and the other roller has a concave curvature proportional to the reciprocal of the radius of a second circle. In some embodiments, the radius corresponding to one of the rollers is larger than the radius corresponding to the other roller. For example, in some embodiments of a GBD, the ring roller radius is larger than the planet roller radius allowing for a point contact interface which can improve efficiency as opposed to a line contact. The point contact also reduces the slippage friction which occurs due to speed difference that varies along the roller radius. The two rollers can mate at a point such that a circle corresponding to the curvature of the first roller is tangent to a circle corresponding to the curvature of the second roller. In some embodiments, the two rollers mate at the pitch diameter of the two gears.

In some embodiments, the roller contact surfaces can be angled such that a line passing through the centers of the two tangent circles and the point where the circles mate forms a contact angle at the pitch diameter. By 'angled' as used herein, it is meant that the line tangent to the two circles at the mating point of the two gears angularly deviates from or is out of plane with a surface that is parallel to the rotation axis of the gear. In some embodiments, a 45° angle can be used to distribute the bearing load equally in the thrust and radial directions. In some embodiments, any angle between 0° and 90° can be used depending on the arrangement of the gears components and the axial and radial forces that need to be balanced. The radius defining the curvature of the rollers can be chosen as a function of contact pressure and contact stress.

In some embodiments, the rollers can comprise any material capable of supporting high speed contact (e.g., AMPCO 45 bronze, stainless steel or Nitronic steel).

In some embodiments, a four point contact results when two contact points are used to balance a gear system radially and two contact points are used to balance a gear system axially. FIG. 4A illustrates force balance on a multistage planets subassembly, as described in some embodiments of the present disclosure. A 4-point contact bearing 401 is implemented in a planetary system with an input stage 430 and an output stage 420. FIG. 4B illustrates force balance on a single stage planetary subassembly, as described in some embodiments of the present disclosure. A 4-point contact bearing 401 is implemented in a single stage planetary system 440. When curved rollers are used on both sides of the gearbox, the planets subassembly behaves as a 4-point contact bearing 401 which can support radial, thrust, and moment loads all at once. The resulting forces acting on the planets rollers constrain the planets to rotation along their longitudinal axis and prevent lateral and axial wobbling which can severely reduce the efficiency of the drive.

In some embodiments, to ensure a high rigidity in the system, the planets are pre-stressed to ensure a high rigidity in the system and to counter the deflections that could be caused under external loadings. The prestressing of the planets can keep the contact points at the pitch diameter throughout the gear-mesh cycle. When wearing occurs, the rollers wear evenly causing the planets subassembly to shrink as a result of its stiffness, however when the subassembly shrink the rollers are shifted inward to maintain the same previous contact pitch point such that it continuously maintain gearset alignment throughout the wear process. In some embodiments, a 4-point angular contact between a planets subassembly and ground and output rings is similar in principle to Gothic arch bearings. The resulting forces acting on the planets rollers can constrain the planets in rotation along their longitudinal axis to prevent lateral and axial wobbling which can severely reduce the efficiency of the drive. In some embodiments, the 4-point bearing is achieved using curved rollers that mate at the pitch diameter forming a 90 degree pressure interface. This can eliminate the shear forces that are exerted on the gear teeth using standard parallel rollers and distribute the thrust and radial forces evenly between the rollers. Distributing the load equally between the rollers can produce even roller wear, which consequently can maintain gearset alignment for longer operation life. In some embodiments, ball bearing raceways 402 are grooved between the input and output sun and ring gears to balance and compensate for the planets pre-stress and ensure a smooth output operation. Ball bearing raceways can function as thrust bearing elements in the system.

With the curved roller approach, a planetary gear system can be built by assembling the two gear stages separately then adding and tightening the rollers from both sides of the assembly. When the planets rollers are tightened, they can function as a flat head screw to align the planets subassembly along their orbit axis to ensure that the gear teeth of both planets mesh at their pitch diameter to operate properly.

The invention can also be applied to other gear systems to eliminate the need for external ball bearings and carriers which add cost, weight, volume and overall manufacturing complexity. The angular contact rollers can be applied to reduce the complexity of elementary planetary gear trains by constraining the sun, planets and ring gear, in one or more stages without ball bearings or a planet carrier.

Roller Surfaces Applied to a Gear Bearing Drive

In one embodiment using a dual stage planetary gearbox, the rolling surfaces from the sun, planet and ring locate the planet in its orbit but do not interfere with its rotation. The gears act to transfer the torque and the surfaces (rollers) perform the bearing support function in the thrust and radial directions. For example, when the curved rollers are used on both sides of a gearbox in a planetary configuration, the planets subassembly can behave as a 4-point contact bearing which can support radial, thrust, and moment loads all at once.

Figure 1:
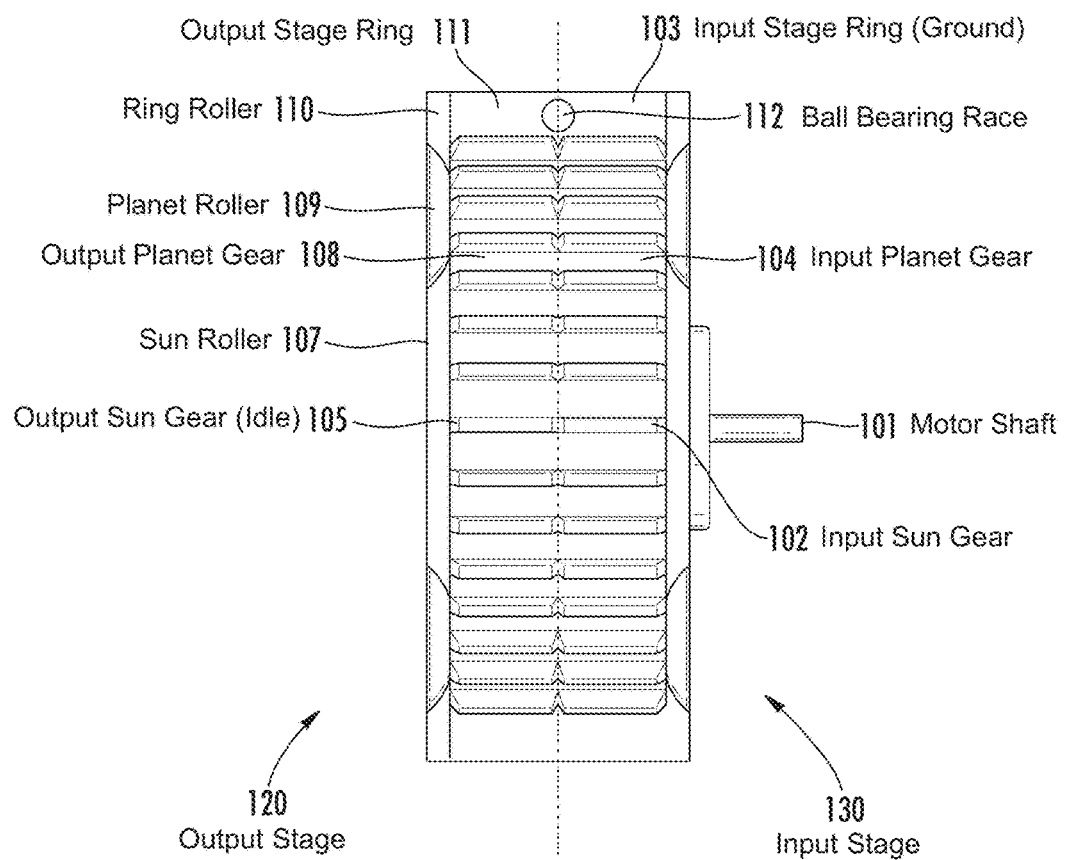
FIG. 1 illustrates a gear bearing drive using curved roller surfaces, as described in some embodiments of the present disclosure.

FIG. 1 illustrates a gear bearing drive using curved roller surfaces, as described in some embodiments of the present disclosure. FIG. 1 illustrates an input stage 130, which comprises a motor shaft 101, an input sun gear 102, an input stage ring 103, and an input planet gear 104. FIG. 1 also illustrates an output stage 120, which comprises an output sun gear 105, a sun roller 107, an output planet gear 108, a planet roller 109, a ring roller 110, and an output stage ring 111. A ball bearing race 112 runs in between the input stage 130 and the output stage 120.

The motor shaft 101 is operably connected to one end of the input sun gear 102. In some embodiments, the motor shaft 101 can be operably connected to a motor located within the input sun gear 102. In some embodiments, an actuator can use an external rotor brushless motor, also referred to as 'outrunner', a DC motor that is commonly used in model airplanes.

Figure 2:
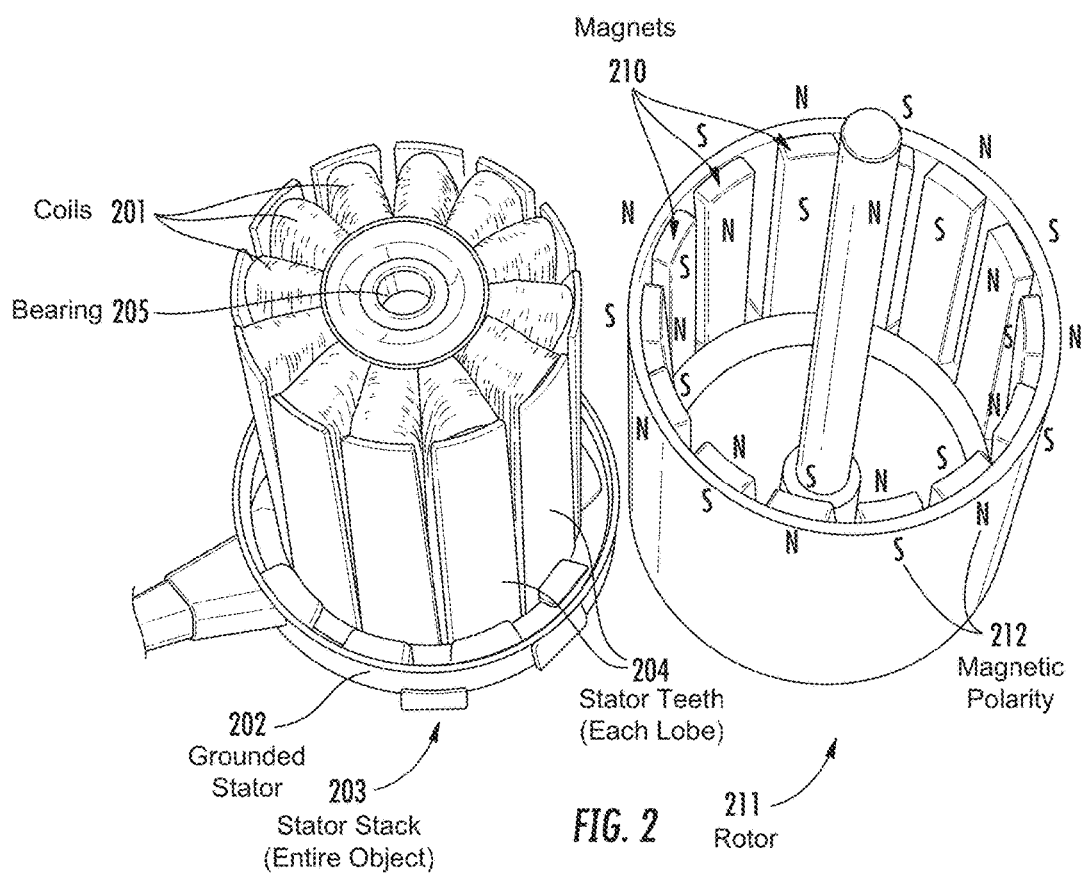
FIG. 2 illustrates the components of a brushless 'outrunner' motor, as described in some embodiments of the present disclosure.

FIG. 2 illustrates the components of a brushless 'outrunner' motor, as described in some embodiments of the present disclosure. The motor can fix coils 201 to an end bell (grounded stator) 202 and place magnets 203 on a rotating shell (rotor) 211. The ground stator 202 can further comprise a stator stack 203, a plurality of stator teeth 204, and a bearing 205. FIG. 2 also illustrates the magnetic polarity 212 in the rotor 211. Outrunner motors have permanent magnets 210 on the rotor 211 that move when the coils 201 are charged. The motor is designed so that magnetic fields produced by the magnets 210 are always out of alignment, causing the rotor to rotate. Because the magnetic shell of the motor rotates, in some embodiments, it can be embedded in the first stage sun gear to drive the mechanism in a very compact and effective approach. Additionally this motor design has a higher torque output, greater heat dissipation, and a lower part count when compared to standard DC motor designs.

The output sun gear 105 and output sun roller 107 are coaxially disposed at the other end of the input sun gear 102 at the output side. In some embodiments, the input stage ring 103 is fixed and the input 104 and output stage planets 108 revolve around the central axis driven by the sun gear 102. In some embodiments, there is a difference in tooth count between the input planets 104 and output planets 108. In some embodiments, the difference in tooth count causes the output side ring 111 gear to rotate. In some embodiments, the output sun roller 107 stabilizes the drive and keeps the pinion sub-assemblies aligned correctly. The output sun roller 107 includes a sun roller bearing surface facing radially outwardly, which rolls without slipping on corresponding roller bearing surfaces of the pinion or planet sub-assemblies. In some embodiments, the planet rollers (e.g., 109) have a bearing surface facing radially outwardly, which can roll without slipping on corresponding roller bearing surface of the sun roller (e.g., 107) and the ring roller (e.g., 110). In some embodiments, the ring rollers (e.g., 110) have a bearing surface facing radially inwardly, which can roll without slipping on corresponding roller bearing surfaces of the planet rollers (e.g., 109).

In some embodiments, the gears of the input sun gear 102 mesh with the gears of the input planet gear 104. In some embodiments, the gears of the output sun gear 105 mesh with the gears of the output planet gears 108. The planet roller 109 is coaxially disposed on the output side of the output planet gear 108. The output planet roller 109 is in contact with the output sun roller 107 and in contact with the output ring roller 110. In some embodiments, the contact between the planet roller 109 and the sun roller 107, and the contact between the planet roller 109 and ring roller 110 are curved contact surfaces. In some embodiments, the contact surface forms a curved roller bearing. The output stage ring 111 and the input stage ring 103 can comprise a ball bearing race 112 grooved in between the two rings. The ball bearing race 112 can serve as a thrust bearing.

Figure 21:
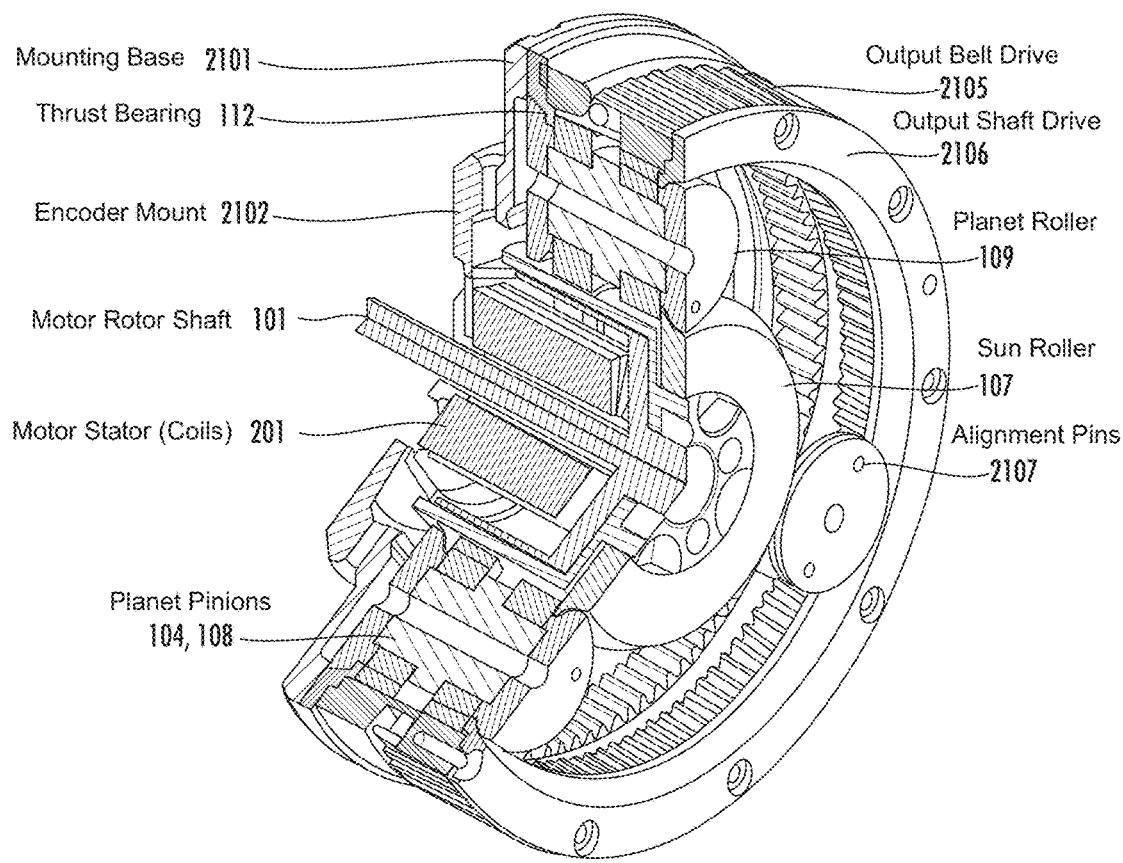
FIG. 21 illustrates another view of a GBD with curved rolling surfaces, as described in some embodiments of the present disclosure.

FIG. 21 illustrates another view of a GBD with curved rolling surfaces as described in some embodiments of the present disclosure. FIG. 21 illustrates certain features discussed in FIGS. 1 and 2, such as a motor rotor shaft 101, a motor stator and coils 201, a thrust bearing 112, planet pinions 104 108, a planet roller 109 and a sun roller 107. FIG. 21 also illustrates a mounting base 2101, an encoder mount 2102, an output belt drive 2105, an output shaft drive 2106, and alignment pins 2107.

A mounting base 2101 attaches to the input stage of the GBD and can be used to position the GBD to an efficient operating level. An encoder mount 2012 also attaches to the input side of the GBD and can provide feedback for speed and position control. An output belt drive 2105 can be a flexible power transmission element that can contain all the gear components and form a perimeter around the gear components. The GBD can also comprise an output shaft drive 2106 that can receive power from the GBD and transfer it to an output source. The output shaft drive 2106 and the output belt drive 2105 enable the GBD to transfer power in two directions (e.g., inline via output shaft and parallel via a timing belt pulley). The GBD can also comprise alignment pins 2107, which can be used to keep the gears in place.

Figure 3:
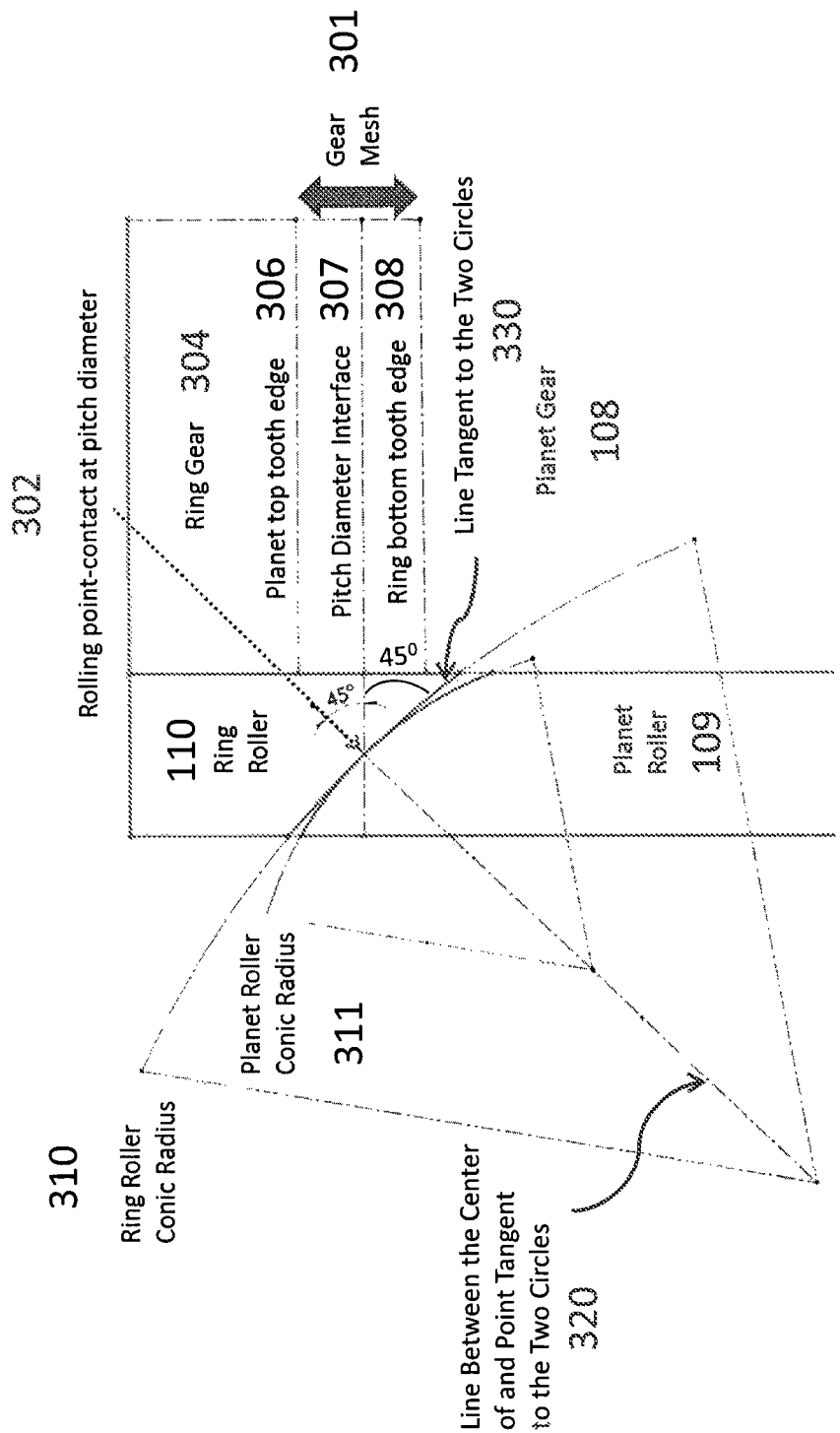
FIG. 3 illustrates a curved roller bearing, as described in some embodiments of the present disclosure.

FIG. 3 illustrates a curved roller bearing, as described in some embodiments of the present disclosure. FIG. 3 illustrates a ring gear 304, a planet gear 108, gear mesh 301, planet top tooth edge 306, pitch diameter interface 307, ring bottom tooth edge 308, ring roller 110, planet roller 109, planet roller conic radius 311 and ring roller conic radius 310, a line between the center of two circles corresponding to the two conic radii and a point tangent to the two circles 320, and a line tangent to the two circles 330.

In some embodiments, the pitch diameter 307 can be defined in terms of the gear mesh 301. The pitch diameter passes through the center of each tooth, or in the center of the gear mesh 301. In FIG. 3, the gear mesh 301 comprises the distance between the planet top tooth edge 306 and the ring bottom tooth edge 308. In some embodiments, the pitch diameter interface 307 represents the point where the planet gear teeth and ring gear teeth engage in pure rotation motion. In FIG. 3, the rollers 109 110 are formed by two tangent circles 310 311 such that the line passing through their centers and a point tangent to the two circles 320 form a 45 degree angle with the pitch diameter interface 307. In this example, a 45 degree angle creates a point contact subject to pure rolling as it belongs to the pitch diameter 302 and consequently improves the overall efficiency of the bearing. In some embodiments, an angle can also be defined by the line tangent to the two circles 330 relative to the pitch diameter interface 307.

Figure 22:
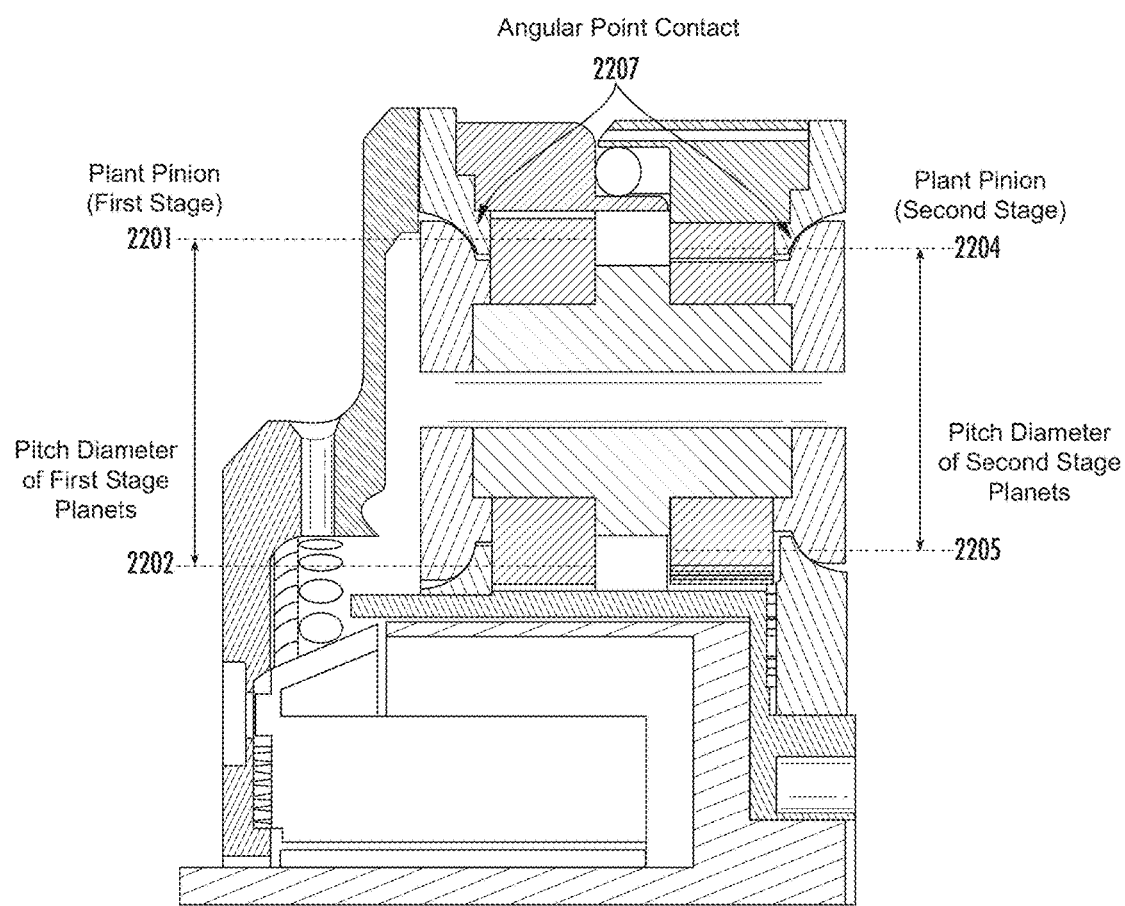
FIG. 22 illustrates a view of curved roller bearings as implemented in a GBD, as described in some embodiments of the present disclosure.

FIG. 22 illustrates a view of curved roller bearings as implemented in a GBD, as described in some embodiments of the present disclosure. FIG. 22 illustrates a first stage planet pinion 2201, a pitch diameter associated with the first stage planet 2202, a second stage planet pinion 2204, a pitch diameter of a second stage planet pinion 2205, and an angular point contact for each of the planet pinions 2207. As shown in FIG. 22, the point of contact of the curved rollers at the first stage 2207 occurs at the pitch diameter of the first stage planet 2202 and the point of contact at the second stage 2207 occurs at the pitch diameter of the second stage planet 2205.

Figure 5:
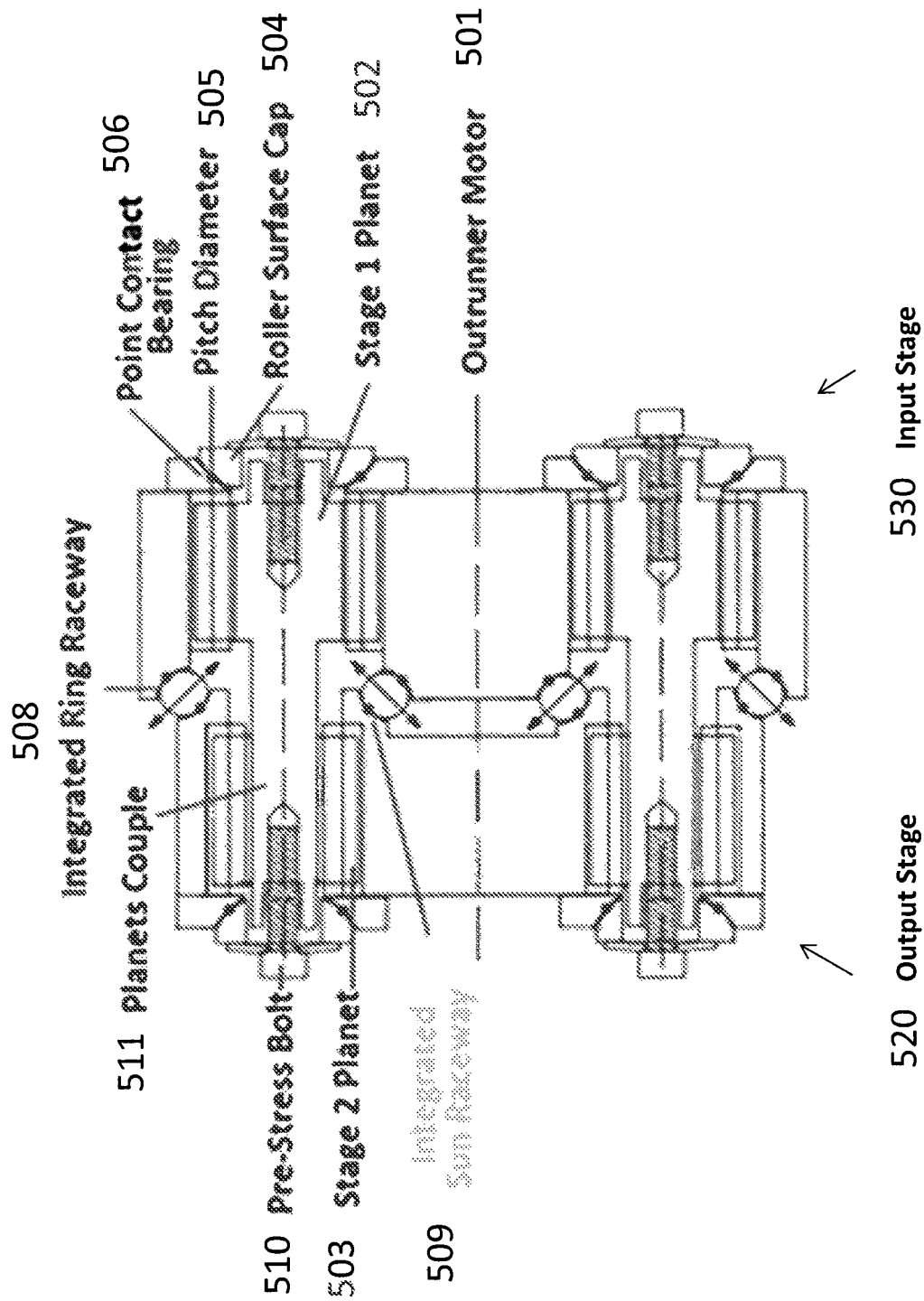
FIG. 5 illustrates a longitudinal cut through the GBD showing curved roller surfaces, as described in some embodiments of the present disclosure.

FIG. 5 illustrates a longitudinal cut through the GBD showing curved roller surfaces, as described in some embodiments of the present disclosure. FIG. 5 illustrates certain features discussed in FIGS. 1 and 2, such as an outrunner motor 501, a stage 1 planet 502, a stage 2 planet 503, a roller surface cap 504, a pitch diameter 505, and a point contact bearing 506. FIG. 5 also illustrates a pre-stress bolt 510, a planets couple 511 joining stage 1 planet 502 and stage 2 planet 503, an integrated ring raceway 508 and an integrated sun raceway 509.

Pre-stressed bolts 510 secure the roller surfaces 504 to the planets 502 503. The input stage planet 502 and output stage planet 503 are also coupled 511 via the bolts 510 and alignment pins. When the input stage planet 502 rotates, the corresponding output stage planet 503 also rotates.

An integrated raceway 509 is grooved between the input stage 530 and the output stage 520 at the sun interface. An integrated raceway 508 is also grooved between the input and output stages at the ring interface 508. In some embodiments, the integrated raceways feature Gothic arch raceways. In some embodiments, a Gothic arch raceway can force a 4-point contact for each of the balls under the planets preload. The raceways 508 509 can help to improve the output stage by rigidly supporting the external loads and moments acting on the output stage without affecting the drive efficiency.

Figure 6:
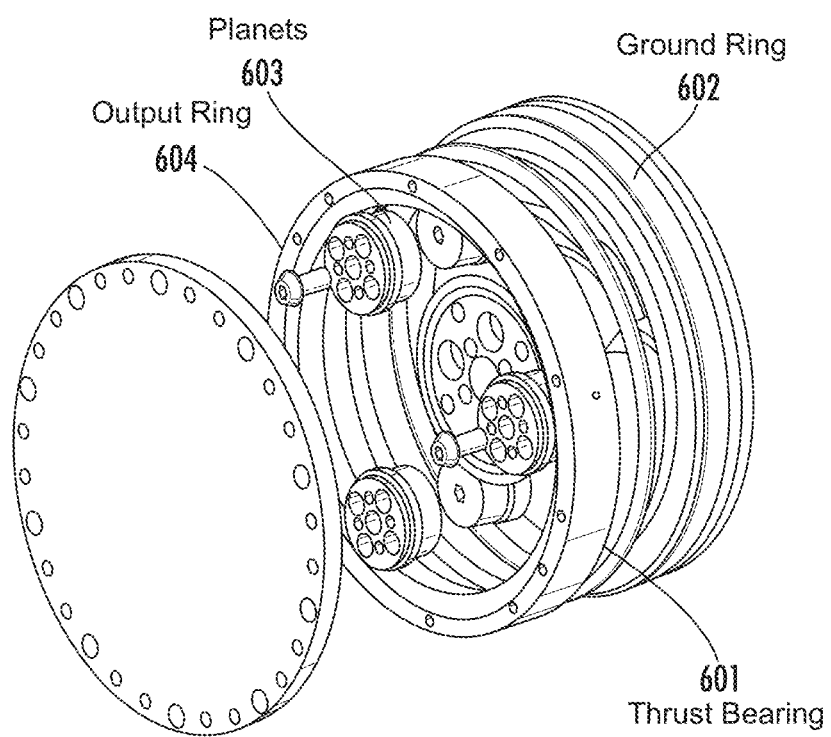
FIG. 6 illustrates a thrust bearing and axially pre-stressed planets, as described in certain embodiments of the present disclosure.

FIG. 6 illustrates a thrust bearing and axially pre-stressed planets, as described in certain embodiments of the present disclosure.

In some embodiments, to reduce the lateral wobble of the GBD output and to improve overall drive efficiency, a thrust bearing 601 can be introduced between the ground 602 and the output ring 604, and the planets 603 can be axially pre-stressed. By pre-stressing the couple between the input and output planets 603, the output ring 604 can be compressed against the input ring via the output planets and output ring rollers, yet will freely slide against the ground ring 602 due to the interface thrust bearing 601. When the output ring 604 is subjected to a cantilever load (bending or shear), it can maintain a parallel position with respect to the ground ring 602 due to the pre-stress of the planets, and consequently forces the output stage rollers to remain in sync with input stage rollers and hence reduces the stresses applied on the rollers and improve the efficiency of the system.

Carrier System

In some embodiments, a carrier system can be inserted into a gear bearing drive. When high external loads are applied to the system, the planets can become misaligned on a radial plane perpendicular to the axis of rotation. In some embodiments, planets can be fastened to a carrier. A carrier can be used to keep planets parallel to one another throughout the mesh cycle. In some embodiments, a carrier system can be fastened with a carrier lock (e.g., a cage or a shoulder bolt).

Figure 24:
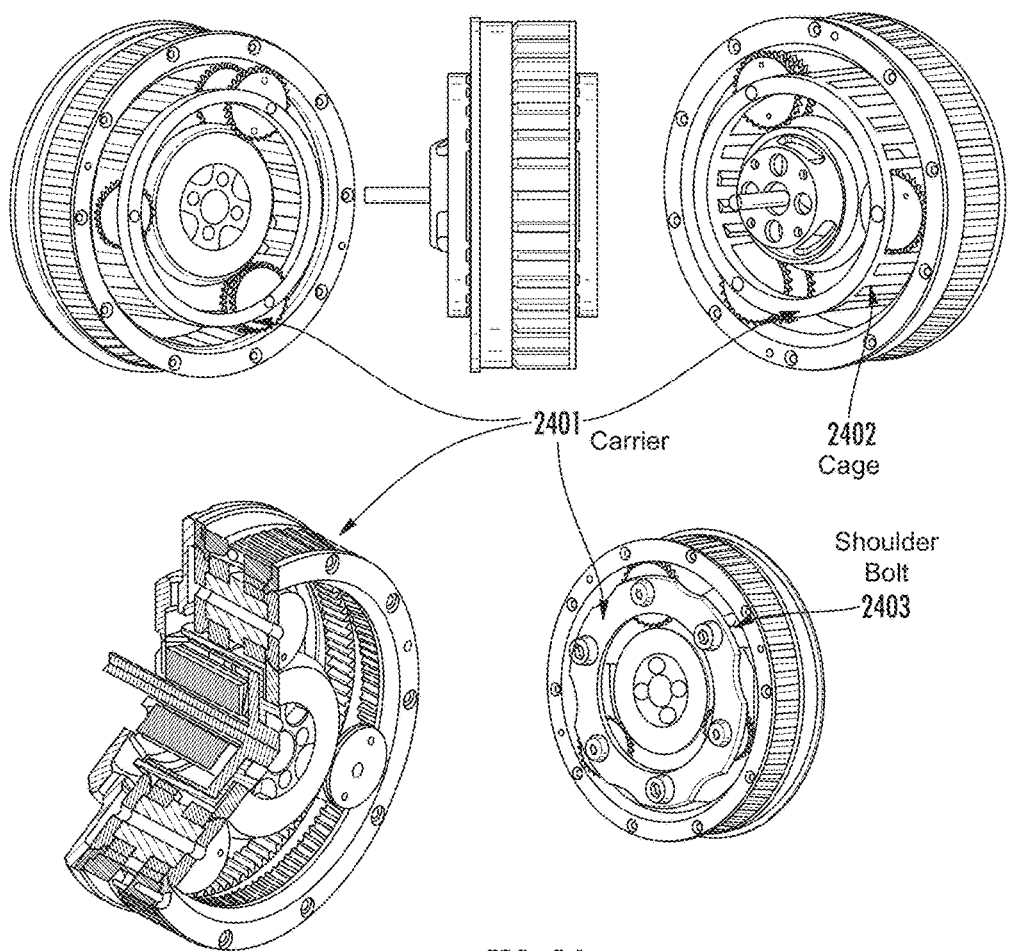
FIG. 24 illustrates a GBD having a carrier, as described in some embodiments of the present disclosure.

FIG. 24 illustrates a GBD having a carrier, as described in some embodiments of the present disclosure. A carrier 2401 is attached to planet pinions on both the input and output stages. In some embodiments, a cage 2402 is used to attached the input and output carriers. In some embodiments, the carrier can be connected by a shoulder bolt 2403.

Gear Bearing Drive Configurations and Kinematic Modeling

A GBD can be configured in different ways depending on the application. Different arrangements of the gears and different methods of driving the gears can result in high and low speed reducers as well as speed increasers. Each configuration can produce a unique kinematic model. In some embodiments, a gear bearing drive can have more than one output stage. The different stages can have different mechanical advantages such that the GBD produces different torque outputs in different stages.

Inrunner/Outrunner

Figure 7A:
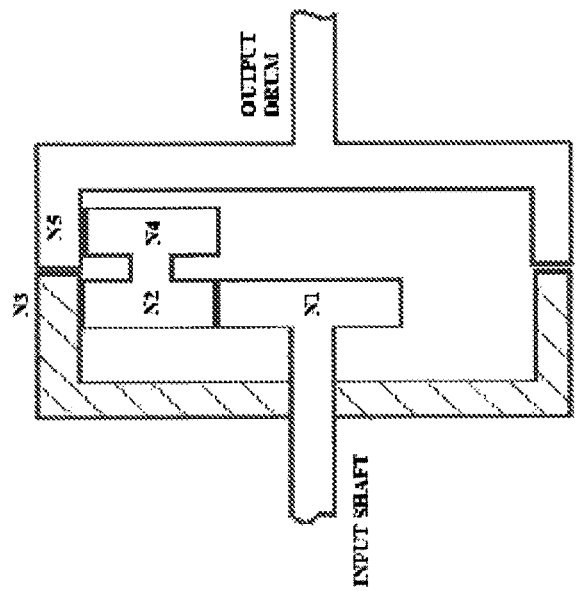
FIG. 7A illustrates an inrunner/outrunner configuration of the gear bearing drive, as described in some embodiments of the present disclosure.

FIG. 7A illustrates an inrunner/outrunner configuration of the gear bearing drive, as described in some embodiments of the present disclosure.

The input to this mechanism is the torque of the first stage sun gear 701, and the output is the perceived torque at the second stage ring gear 703. The first stage ring 702 is fixed and treated as the ground. The equilibrium of the forces acting on the planets yields the overall torque advantage of the mechanism as illustrated in FIG. 7A. The torque advantage can be calculated by summing the torques with respect to the instantaneous center of rotation (point B):

$$F \cdot (2b) = f_{p2} \cdot (b - d) \quad (1)$$

$$\frac{T_{out}}{T_{in}} = \frac{2 \cdot b \cdot e}{a \cdot (b - d)} \quad (2)$$

where a, b, d, and e, denote the pitch diameters of the sun gear, input planets, output planets, and output ring respectively; $T_{in}$ denotes the input torque from the motor and $T_{out}$ is the amplified torque at the output ring.

In this configuration, the slight differences in the pitch diameters of the planets create large torque advantages between the input sun and output ring. This occurs because the input tangential force resulting from the motor torque, F, acts on a moment arm of 2b that is much larger than the moment arm (b-d), equal to the difference in the planets pitch diameters, acted upon by the perceived ring force $f_{p2}$. Furthermore, the direction of motion of the output relative to the input is also dictated by the size difference of the planets. When the pitch diameter of the input stage planet is greater than the pitch diameter of the output stage planet, the denominator of Eqn. 1 takes a positive value and causes the output to rotate in the same direction as the input and vice versa.

Figure 8:
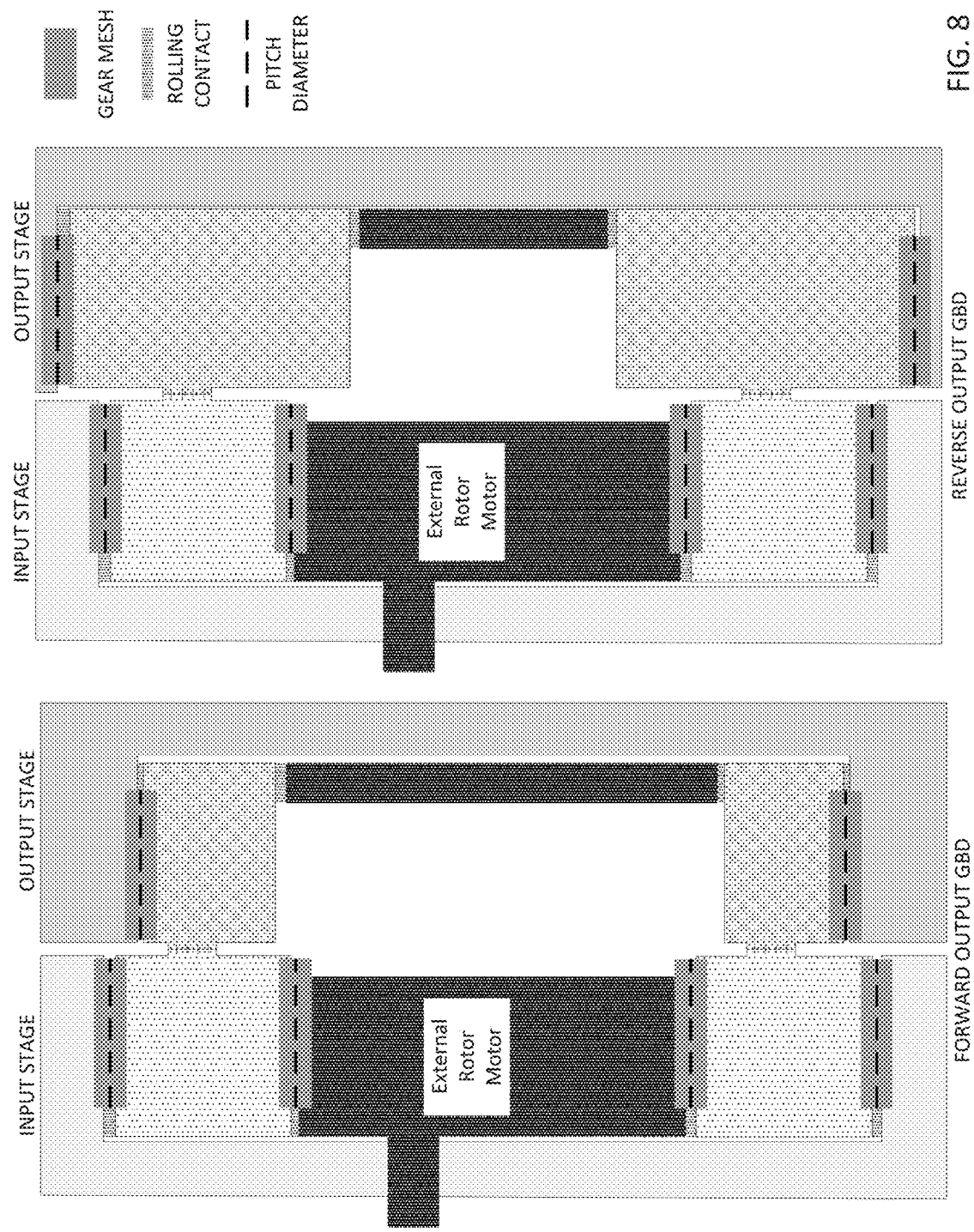
FIG. 8 illustrates forward and reverse configurations, as described in some embodiments of the present disclosure.

FIG. 8 illustrates the forward and reverse configurations, as described in some embodiments of the present disclosure. Incorporating small variations in the planets diameters produces very high torque ratios without altering the overall form factor of the mechanism. This configuration is referred to as the inrunner/outrunner mode due to the inner driving input sun gear and outer driven output ring gear, and it is adopted to develop the Gear Bearing Drive given its configurable high reduction ratios and applicability for embedding the external rotor motor within the input stage sun gear.

Figure 7B:
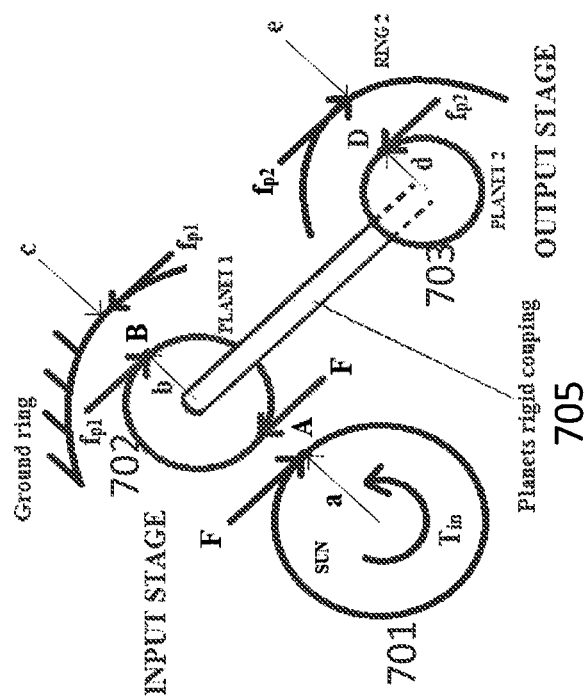
FIG. 7B illustrates a kinematic representation of the GBD assembly, as described in some embodiments of the present disclosure.

FIG. 7B illustrates a kinematic representation of the GBD assembly, as described in some embodiments of the present disclosure.

The kinematic model of the inrunner/outrunner GBD configuration can be further developed into relating the torque ratio with the permissible number of teeth on each gear element. The kinematic equations of motion are developed with respect to an imaginary arm speed, and then inverted with respect to ground. The arm constitutes an imaginary axis passing through the pinions axis of rotation and revolving around the sun gear. N1 through N5 denote the number of teeth on the first stage sun N1, first stage planets N2, first stage ring N3, second stage planets N4, and second stage ring N5 respectively as shown in FIG. 7B.

The overall angular speed of the input (first stage sun) with respect to the ground can be written as:

$$w_{Input} = w_{Input/Arm} + w_{Arm} \quad (3)$$

The angular speed of the first stage pinion with respect to the arm is written as:

$$w_{2/Arm} = -\frac{N_1}{N_2} w_{Input/Arm} \quad (4)$$

The angular speed of the first stage ring (i.e. ground) with respect to ground is zero. Hence, $$w_3 = w_{3/Arm} + w_{Arm} = 0 \quad (5)$$

The speed of ground with respect to the arm is:

$$w_{3/Arm} = \frac{N_2}{N_3} w_{2/Arm} \quad (6)$$

From Eqns (4) and (6), the arm speed can be extracted as:

$$w_{Arm} = -w_{3/Arm} = -\frac{N_2}{N_3} w_{2/Arm} = \frac{N_1}{N_3} w_{Input/Arm} \quad (7)$$

Substituting Eqn. (7) back into Eqn. (3), the input speed with respect to ground is:

$$w_{Input} = w_{Input/Arm} + \frac{N_1}{N_3} w_{Input/Arm} = \left(1 + \frac{N_1}{N_3}\right) w_{Input/Arm} \quad (8)$$

The pinions of both stages have equal angular velocity since they are rigidly coupled, hence:

$$w_{2/Arm} = w_{4/Arm} \quad (9)$$

The output (second stage ring) speed with respect to the arm is determined as:

$$w_{Output/Arm} = \frac{N_4}{N_5} w_{4/Arm} = \frac{N_4}{N_5} w_{2/Arm} = -\frac{N_1 N_4}{N_2 N_5} w_{Input/Arm} \quad (10)$$

The output speed with respect to ground is determined as:

$$w_{Output} = w_{Output/Arm} + w_{Arm} = \left(-\frac{N_1 N_4}{N_2 N_5} + \frac{N_1}{N_3}\right) w_{Input/Arm} \quad (11)$$

Dividing Eqn. (8) by Eqn. (11), the final angular velocity ratio, or alternatively torque ratio, is determined as:

$$\frac{w_{Input}}{w_{Output}} = \frac{1 + \frac{N_3}{N_1}}{1 - \frac{N_3 N_4}{N_2 N_5}} \quad (12)$$

Eqn. (12) dictates the permissible number of teeth imposed on each gear element for a given torque ratio. An additional geometrical condition on the first stage requires that the number of teeth on the ground ring be equal to the sum of sun gear teeth and twice of the input pinion teeth according to Eqn. (13).

$$N_3 = N_1 + 2N_2 \quad (13)$$

Furthermore, gears that mesh with each other must have the same diametral pitch and pressure angle properties in order to engage in pure rolling contact. The diametral pitch, denoted by P, is a measure of the number of teeth per inch and is related to the number of teeth, N, and pitch diameter, D, by Eqn. (14).

$$P = \frac{N}{D} \quad (14)$$

The pressure angle defines the shape of the tooth involutes of the spur gears such as the addendum, dedendum, whole depth, and base circle. Another condition is imposed on the pitch diameters since the planets of both stages must orbit at the same radial distance from the sun, as described by Eqn. (15).

$$\frac{N_1}{P_1} + \frac{N_2}{P_1} = \frac{N_5}{P_2} - \frac{N_4}{P_2} \quad (15)$$

Eqns. (12), (13) and (15) reduce the total number of unknowns to three that were iteratively solved to develop the planetary gearbox of the GBD. Also, we note that Eqn. (12) can be obtained by substituting Eqn. (15) into Eqn. (2).

Additional mathematical constraints are dictated on the permissible number of teeth on each gear since gear teeth must be integer numbers. The discussion will be limited to the GBD equation, as written in Eqn. (12); however the same process can be applied to any of the other configurations.

The terms of Eqn. (12) are re-arranged in the following form, where R is the desired gear ratio.

$$\frac{N_4}{N_5} = \frac{R N_1 N_2 - 2 N_2 (N_1 + N_2)}{R N_1 (N_1 + 2 N_2)} = \frac{p}{q} \quad (16)$$

For integer values of R, the resulting p and q must also be integer numbers, hence $N_4$ and $N_5$ are calculated as:

$$N_4 = \frac{p}{GCF(p, q)} \quad (17)$$

$$N_5 = \frac{q}{GCF(p, q)} \quad (18)$$

Where GCF (p,q) is the greatest common factor of p and q. Therefore, only the gear ratio and input stage sun and pinion gears number of teeth needs to be known (R, $N_1$, $N_2$) in order to calculate the remaining values for the number of the teeth on the GBD assembly.

Inrunner/Inrunner

Figure 9:
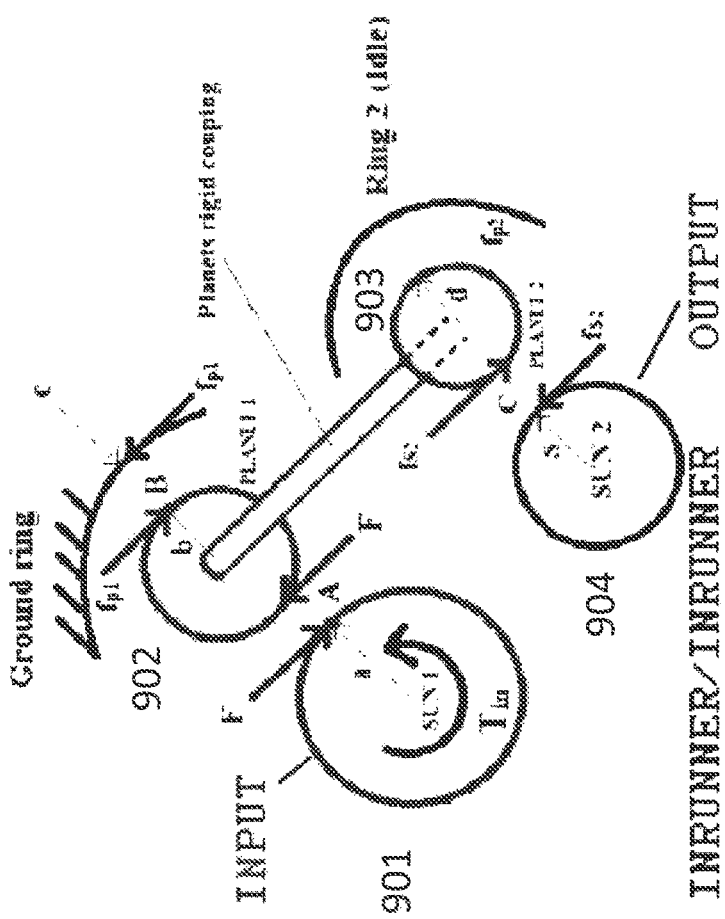
FIG. 9 illustrates an inrunner/inrunner configuration of the GBD, as described in some embodiments of the present disclosure.

FIG. 9 illustrates an inrunner/inrunner configuration of the GBD, as described in some embodiments of the present disclosure. FIG. 9 illustrates adding a sun gear 904 to the output stage to form the actuator output, and setting the output stage ring gear 903 idle. This mode of operation can produce customizable low torque ratio gearheads, and also has the capability to perform speed-augmenting functions such as speed increaser devices. Since the output gear is now shifted to the second stage sun gear 804, as opposed to the second stage ring gear 903, Eqns. (10-12) are modified to account for this change in the power path.

Eqn. (10) is re-written as:

$$w_{Output/Arm} = -\frac{N_4}{N_6} w_{4/Arm} = -\frac{N_4}{N_6} w_{2/Arm} = \frac{N_1 N_4}{N_2 N_6} w_{Input/Arm} \quad (19)$$

Eqn. (11) is then calculated as:

$$w_{Output} = w_{Output/Arm} + w_{Arm} = \left(\frac{N_1 N_4}{N_2 N_6} + \frac{N_1}{N_3}\right) w_{Input/Arm} \quad (20)$$

The final angular speed ratio is obtained by dividing Eqn. (8) by Eqn. (20).

$$\frac{w_{Input}}{w_{Output}} = \frac{1 + \frac{N_3}{N_1}}{1 + \frac{N_3 N_4}{N_2 N_6}} \quad (21)$$

Furthermore, since the input and output planets must orbit at the same radial distance, the pitch diameters must satisfy the following relationship as expressed by Eqn. (22).

$$\frac{D_1}{2} + \frac{D_2}{2} = \frac{D_4}{2} + \frac{D_6}{2} \quad (22)$$

By substituting Eqn. (14) into (22), Eqn. (22) can be re-written using the gears number of the teeth and diametral pitch selected:

$$\frac{N_1}{P_1} + \frac{N_2}{P_1} = \frac{N_6}{P_2} + \frac{N_4}{P_2}$$

Outrunner/Inrunner

Figure 10:
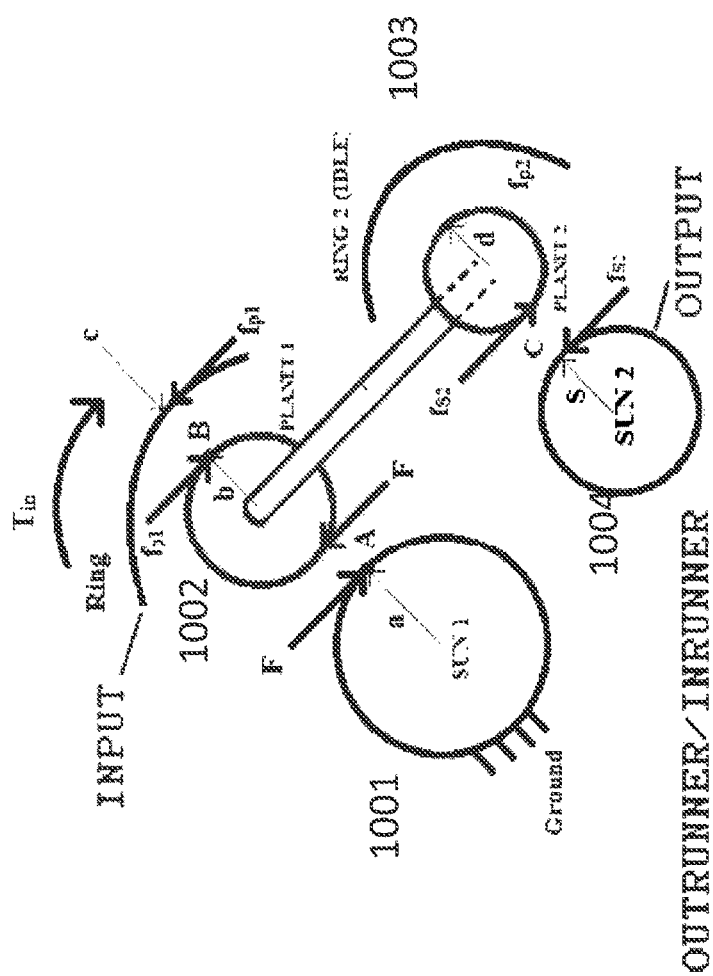
FIG. 10 illustrates an outrunner/inrunner configuration of the GBD, as described in some embodiments of the present disclosure.

FIG. 10 illustrates an outrunner/inrunner configuration of the GBD, as described in some embodiments of the present disclosure.

An outrunner/inrunner configuration is very similar in functionality as the inrunner/outrunner presented previously, except that the input stage ring gear 1002 is driven as opposed to the input stage sun gear 1001 while the output of this mechanism is the output stage sun gear 1004. In some embodiments, the input ring gear 1002 can be actuated by placing a magnet on the ring gear's inner segment, and the motor coils can be fixed to the outer segment of the ring, similarly to a ring motor.

The overall angular speed of the input (first stage ring) with respect to the ground can be written as:

$$w_{Input} = w_3 = w_{InputArm} + w_{Arm} \quad (24)$$

The angular speed of the first stage pinion with respect to the arm is written as:

$$w_{2/Arm} = \frac{N_3}{N_2} w_{Input/Arm} \quad (25)$$

The angular speed of the first stage sun (i.e. ground) with respect to ground is zero. Hence, $$w_1 = \quad (26)$$

$$w_{1/Arm} + w_{Arm} = 0 \Rightarrow w_{arm} = -w_{1/Arm} = \frac{N_2}{N_1} w_{2/Arm} = \frac{N_3}{N_1} w_{Input/Arm}$$

Substituting Eqn. (26) in Eqn. (24), the input angular speed is written as:

$$w_{Input} = \left(1 + \frac{N_3}{N_1}\right) w_{Input/Arm} \quad (27)$$

The angular speed of the output (second stage sun) can be written with respect to the arm as:

$$w_{output/arm} = w_{6/Arm} = -\frac{N_4}{N_6} w_{4/Arm} = -\frac{N_4}{N_6} w_{2/Arm} = -\frac{N_4 N_3}{N_6 N_2} w_{Input/Arm} \quad (28)$$

The output speed with respect to the ground is computed by adding the arm speed to Eqn. (28).

$$w_{output} = w_{output/Arm} + w_{arm} = \left(-\frac{N_4 N_3}{N_6 N_2} + \frac{N_3}{N_1}\right) w_{Input/Arm} \quad (29)$$

The angular speed ratio is calculated by dividing Eqn. (27) by Eqn. (29):

$$\frac{w_{Input}}{w_{Output}} = \frac{1 + \frac{N_1}{N_3}}{1 - \frac{N_1 N_4}{N_2 N_6}} \quad (30)$$

The kinematic conditions described in Eqns. (22) and (23) for the inrunner/inrunner mode also hold for the outrunner/inrunner mode due to the similar gear arrangement of their second stage.

Outrunner/Outrunner

Figure 11:
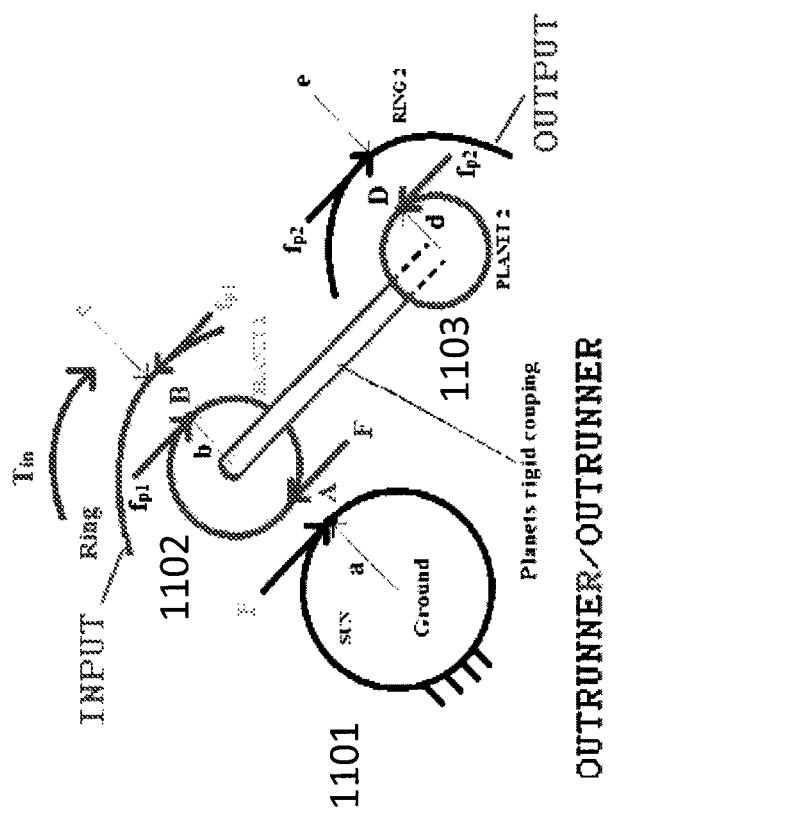
FIG. 11 illustrates an outrunner/outrunner configuration of the GBD, as described in some embodiments of the present disclosure.

FIG. 11 illustrates an outrunner/outrunner configuration of the GBD, as described in some embodiments of the present disclosure. The outrunner/outrunner configuration behaves in the same manner as the inrunner/inrunner mode, but requires the input stage ring gear 1102 to be actuated as opposed to the input stage sun gear 1101.

Since the output gear is now shifted to the second stage ring gear 1103, as opposed to the second stage sun gear in the outrunner/inrunner mode, Eqns. (28-30) are modified to account for this change in the power path.

Eqn. (28) can be re-written as:

$$w_{output/arm} = w_{5/Arm} = \frac{N_4}{N_5} w_{4/Arm} = \frac{N_4}{N_5} w_{2/Arm} = \frac{N_4 N_3}{N_5 N_2} w_{Input/Arm} \quad (31)$$

The output speed with respect to ground is written as:

$$w_{output} = w_{output/Arm} + w_{arm} = \left(\frac{N_4 N_3}{N_5 N_2} + \frac{N_3}{N_1}\right) w_{Input/Arm} \quad (32)$$

The final angular velocity ratio is thus calculated by dividing Eqn. (27) by Eqn. (32).

$$\frac{w_{Input}}{w_{Output}} = \frac{1 + \frac{N_1}{N_3}}{1 + \frac{N_1 N_4}{N_2 N_5}} \quad (33)$$

Similarly, the kinematic condition described in Eqn. (15) for the inrunner/outrunner also holds for the outrunner/outrunner as they both have a similar planetary gear arrangement.

FIG. 12 illustrates in tabular form the status of the sun and ring gears in the four different inrunner-outrunner combinations, as described in some embodiments of the present disclosure. FIG. 12 also illustrates the applications and modes of operation for each configuration. The various modes can be used as a preliminary design tool for selecting a suitable actuated joint for a given application (e.g., high or low-speed reducer, or speed increaser).

FIG. 13 illustrates a summary of the kinematic relationships of the Gear Bearing Drive, as described in some embodiments of the present disclosure. The table summarizes the results of the equations derived above.

Proof of Concept

Figure 14:
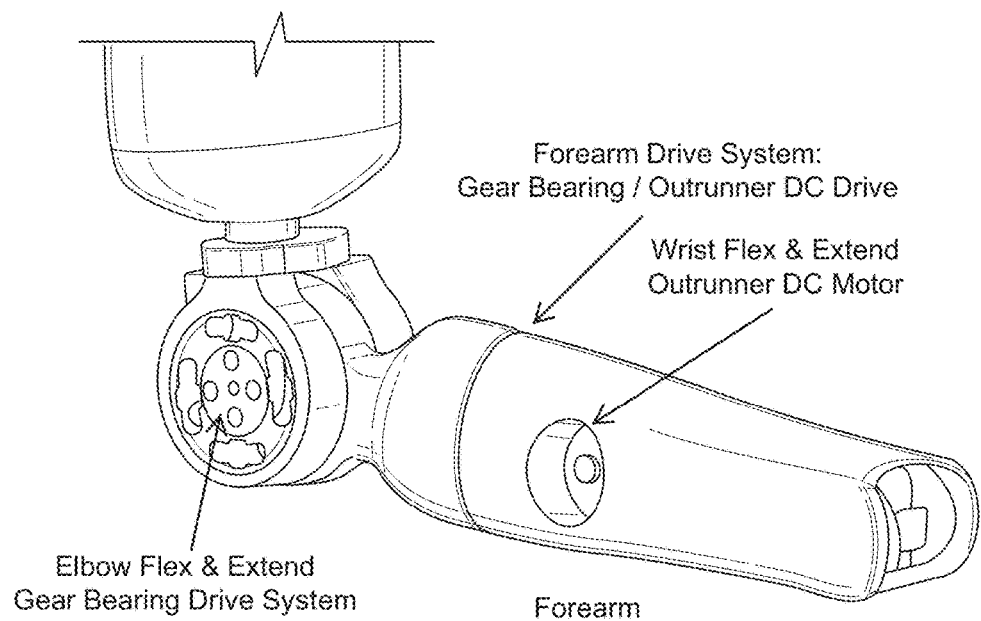
FIG. 14 illustrates a Gear Bearing Drive system for an elbow prosthesis, as described in some embodiments of the present disclosure.

FIG. 14 illustrates a Gear Bearing Drive system for an elbow prosthesis, as described in some embodiments of the present disclosure.

An initial prototype of the Gear Bearing Drive was developed to perform as a robust high-performance and low-cost elbow joint drive system. The actuator was designed for delivering a maximum continuous torque of 26 Nm at a nominal speed of 23 rpm and minimum 5 Hz of bandwidth as required for an elbow prosthesis application as shown in FIG. 14.

A dedicated brushless outrunner motor [Hacker A20-30M] was selected based on its torque-speed characteristics relative to the application requirements. This external-rotor design has higher torque output, increased efficiency (normally 90-95%), greater heat dissipation, and a lower part count when compared to standard DC motor designs. At 13.8 Volts, the motor is able to output 0.19 Nm of stall torque and runs at a no-load speed of 12,100 rpm. A gear-bearing ratio of 264:1 was synthesized to shift the motor torque-speed curve into the desired operating point of 26 Nm and 23 rpm.

Figure 15:
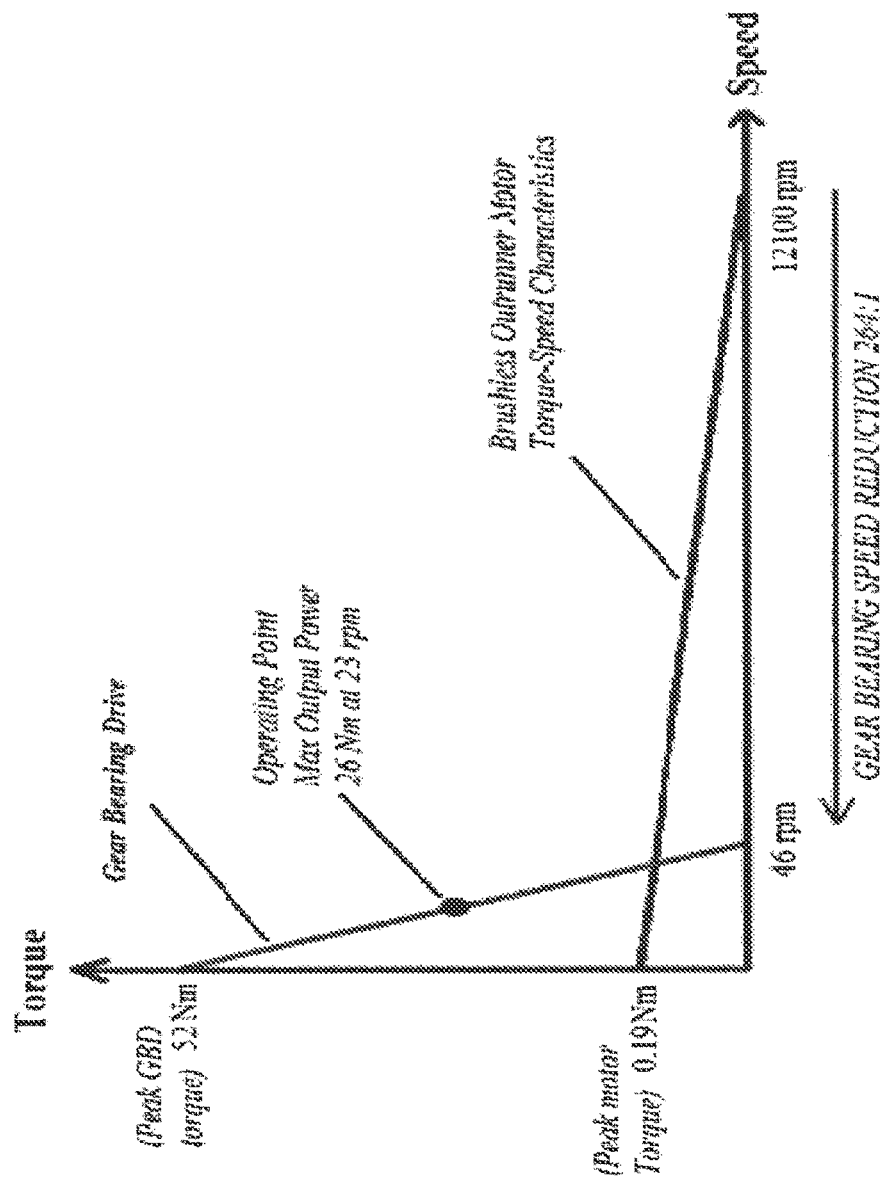
FIG. 15 illustrates a linear torque-speed characteristic for the Gear Bearing Drive motor described in FIG. 14, as described in some embodiments of the present disclosure.

FIG. 15 illustrates a linear torque-speed characteristic for the Gear Bearing Drive motor described in FIG. 14, as described in some embodiments of the present disclosure.

Gearbox Design

After determining the required gear ratio as 1:264, the next step was to specify and integrate the gear-bearing components with the motor selected. A parametric study was run to determine the permissible number of gear teeth on each gear component as dictated by the kinematic equations derived earlier. Industry standard 20-degree pressure angle was selected to provide a combination of smooth operation, low backlash, and high load transfer. The number of teeth was optimized to provide the most compact design form factor using parametric spreadsheet calculations. For this, the American Gear Manufacturers Association (AGMA) minimum recommended number of teeth to avoid undercut interference was selected for the input pinion, equal to 19. The number of teeth for the input ring, output planets and output ring are automatically calculated by Eqns. (13), (17) and (18) respectively. Hence, the only variable remaining was the input stage sun gear number of teeth. For this, a parametric study was run in a program (e.g., Excel) for integer numbers ranging from 20 to 100 for the input stage sun while simultaneously solving for the remaining gears. It was determined that the value 57 for the sun gear number of teeth produced the largest greatest common factor for Eqns. (17) and (18), and subsequently yielded the minimum permissible number of teeth on the output stage planets and output stage ring.

Once the number of teeth was populated for all the gears, the next step was sizing the diameters of the gears, which depends on the geometric and load-capacity requirements of the transmission. The geometric dimensional constraint related to the outside diameter of the motor set a lower limit on the pitch diameter of the input stage sun gear, which required a minimum pitch diameter of 1.475 inches in order to fit the circumference of the external rotor motor. Accordingly, a pitch diameter of 1.5 inches was chosen for the input stage sun gear. Knowing the input sun gear diameter solved the pitch diameters of the remaining gears based on Eqns. (14) and (15) as was shown in FIG. 13. The gears teeth profile curves were generated using standard involute curves through the Integrated Gear Software by Universal Technical Systems Inc. in accordance with AGMA standards and analyzed for strength using the finite element analysis software Cosmos to ensure the design met the torque capacity specifications.

FIG. 16 illustrates the specifications of the Gear Bearing Drive design for the elbow prosthesis described in FIG. 14, as described in some embodiments of the present disclosure.

Figure 17:
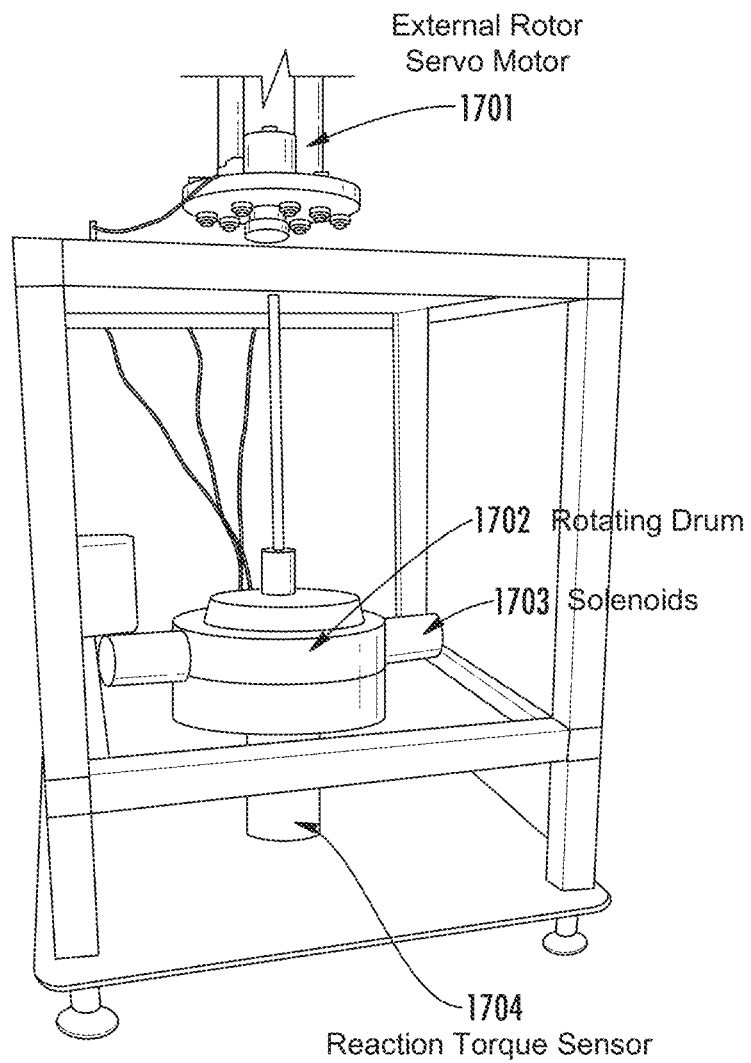
FIG. 17 illustrates a dynamometer used to test the Gear Bearing Drive, as described in some embodiments of the present disclosure.

FIG. 17 illustrates a dynamometer used to test the Gear Bearing Drive, as described in some embodiments of the present disclosure.

In some embodiments, the dynamometer applies friction to a rotating drum 1702 that is directly driven by the external rotor servomotor 1701. Friction brake is applied to the rotating disk via actuated solenoids 1703. The friction torque is measured using a reaction torque sensor 1704, along with the motor current, voltage, and rotational speed. An amplifier can be used to power up the motor using a PI-controller with auto gain-scheduling capability. The amplifier establishes automatic phase commutation through an external encoder mounted on the motor rotor shaft.

FIG. 18 illustrates the results from the dynamometer testing, as described in some embodiments of the present disclosure. The three-phase motorized drive consumes 110 Watts of electric power to deliver a nominal output speed of 23 rpm and 26 Nm resulting in an outstanding efficiency of 85% of the motor and its gear bearing.

Figure 19:
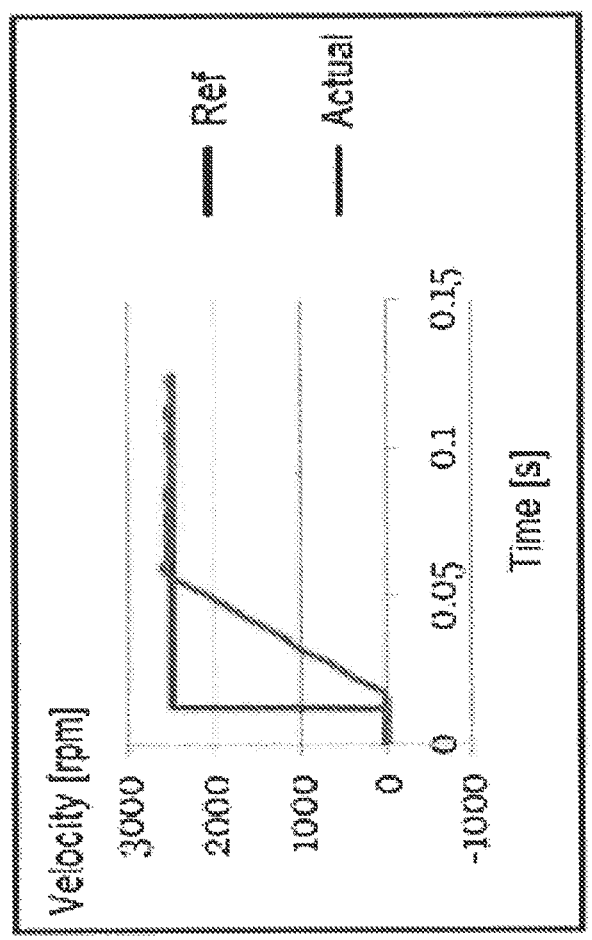
FIG. 19 illustrates a closed-loop step response to velocity reference of 2,500 rpm, as described in some embodiments of the present disclosure.

FIG. 19 illustrates a closed-loop step response to velocity reference of 2,500 rpm, as described in some embodiments of the present disclosure. Additional dynamic testing was done to determine the system robustness for applications requiring certain high frequency torque/position tracking. The drive acceleration and bandwidth were tested using step response testing. The drive shows to exhibit considerably fast response achieving overall velocity bandwidth of 18 Hz, which is inherent from the low inertia of epicyclical gear reducer design. The drive accelerates rapidly at approximately 45,000 rpm/second$^2$ and reaches its maximum output power in a fraction of 0.23 seconds. The GBD prototype weighs only 140 grams and has overall power output density of 0.67 Watts/gram and volumetric power density of 0.50 Watts/cm3.

Design Program

The computer implemented method described herein can reduce trial and error during the actuator development phases. In some embodiments, a set of design methodologies can be generated and implemented (e.g., using MATLAB) to guide the designer throughout the actuator design steps.

In some embodiments, the program can receive as inputs the desired torque and power output and the maximum diameter of the actuator, and the program can solve all the possible configurations of gear parameters to produce the most compact assembly that satisfies the design requirements.

In some embodiments, the program uses the kinematic relationships illustrated in FIG. 13 to calculate the outputs. For example, the program can use parameter permutation to solve equations that govern the dual-stage planetary gearbox. With reference to FIG. 13, N1 to N6 designates the number of teeth on the input sun, input planet, input ring, output sun, output planet and output ring gears respectively; and D1 to D6 represent their respective pitch diameters.

Figure 20:
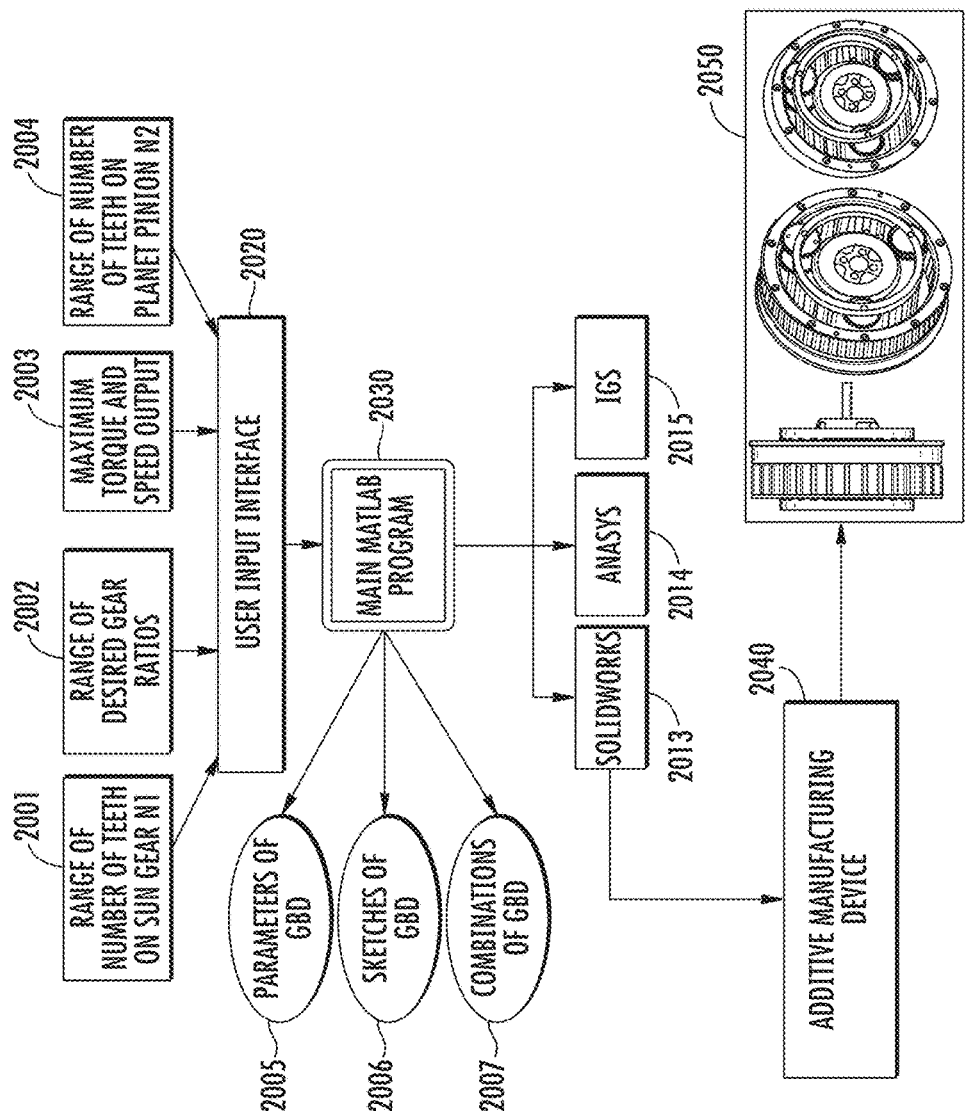
FIG. 20 illustrates a flow chart for a computer implemented method of designing a gear bearing drive, as described in some embodiments of the present disclosure.

FIG. 20 illustrates a flow chart for the computer implemented method for designing a gear bearing drive, as described in some embodiments of the present disclosure.

In some embodiments, the design program 2030 utilizes the equations shown in FIG. 13 to solve the GBD parameters as a function of ranges of the gear ratio, number of teeth on input sun and input planet gears. For example, the program 2030 can receive a user input at a user interface 2020 of a range for the desired gear ratios 2002 (e.g., 250 to 280), range of input planet number of teeth 2001 (e.g., 15 to 30), a range for the input sun gear number of teeth 2004 (e.g., 20 to 50), and a maximum torque and speed output 2003. The program 2030 can receive the inputs and output the most compact drive in terms of output stage gear teeth numbers and teeth strength. The program can output the parameters of the GBD 2005 sketches of the GBD 2006 (e.g., CAD), and different combinations of the GBD 2007. In some embodiments, the program 2030 assumes that the planet spacing is equal for both stages to avoid interferences during the assembly. The program 2030 can be implemented on a design module having a processor and memory configured to store and execute computer readable instructions.

In some embodiments, once all the parameters are identified, the gear properties are calculated using American Society of Mechanical Engineers (ASME) standard tooth profiles for determining the pressure angle, addendum, whole depth, bottom clearance, outside root diameter and inside filet diameter. The corresponding values can be stored in a workspace and analyzed for strength using the gear teeth bending and contact strength analysis with a user-defined minimum safety factor. Once the set of parameters clear the strength analysis it can be exported into an image generation program (e.g., SolidWorks 2013, ANSYS 2014, and Integrated Gear Software (IGS) 2015) for manufacturability analysis and for generating CAD model components. In some embodiments, a transmission module operably connected to a design module can transmit the parameters to an image generation program.

In some embodiments, the CAD model components designed using an image generation program and be prototyped into a functional device (e.g., 2050) using an additive manufacturing device 2040 (e.g., 3D Systems Viper machine) that is based on stereolithohgraphy additive manufacturing technology. In some embodiments, the transmission module can transmit the CAD model components to an additive manufacturing system.

While given components of the system have been described separately, one of ordinary skill in the art also will appreciate that some of the functions may be combined or shared in given executable instructions, program sequences, code portions, and the like.

The subject matter described herein can be implemented in digital electronic circuitry, or in computer software, firmware, or hardware, including the structures and components disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The invention claimed is:

1. A gear contact system configured to support radial, thrust, and moment loads, the system comprising:
    a first gear comprising a first roller having a first roller bearing surface, the first roller bearing surface having a convex curvature defined by a first radius of curvature; and
    a second gear comprising a second roller having a second roller bearing surface, the second roller bearing surface having a concave curvature defined by a second radius of curvature, wherein the second radius of curvature is larger than the first radius of curvature, the second roller bearing surface of the second roller mating with the first roller bearing surface of the first roller at the pitch diameter of the two gears at least a point, such that a line tangent to the point is at an angle with respect to the rotation axis of the first gear, wherein the gear contact system is used in a planetary gear system having an input stage assembly comprising an input sun gear, at least one input planet gear, and an input ring gear; and at least one output stage assembly comprising an output planet gear, the at least one output planet gear coupled to the at least one input gear, and an output ring gear, wherein the at least one output stage assembly further comprises an output sun gear and the input stage assembly further comprises a motor having an external rotor disposed inside an interior region of the input sun gear, wherein the motor drives the input sun gear, the input ring gear is fixed, the output sun gear is idle, and the output ring gear is driven by the input sun gear.

2. The system of claim 1, wherein the angle is between 0 and 90 degrees.

3. The system of claim 1, wherein the angle is between 30 and 60 degrees.

4. The system of claim 1, wherein the angle is between 40 and 50 degrees.

5. The system of claim 1, wherein the angle is 45 degrees.

6. The system of claim 1, wherein the roller bearing surfaces comprise a material that comprises at least one of stainless steel or Nitronic steel.

7. The system of claim 1, wherein the gear contact system is used in a planetary gear system having at least one sun gear, at least two planet gears, and at least one ring gear.

8. The system of claim 1, wherein the motor drives the input sun gear, the input ring gear is fixed, the output sun gear is driven by the input sun gear, and the output ring is idle.

9. The system of claim 1, wherein the motor drives the input ring gear, the input sun gear is fixed, the output sun gear is driven by the input ring gear, and the output ring is idle.

10. The system of claim 1, wherein the motor drives the input ring gear, the input sun gear is fixed, the output sun gear is idle, and the output ring is driven by the input ring gear.

11. The system of claim 1, further comprising a ball bearing raceway grooved between the input stage and the output stage at the interface between the input sun gear and output sun gear.

12. The system of claim 1, further comprising a ball bearing raceway grooved between the input stage and the output stage at the interface between the input ring gear and output ring gear.

13. The system of claim 1, wherein a couple between the at least one input planet gear and the at least one output planet gear is pre-stressed.

14. The system of claim 1, further comprising a carrier configured to keep one input planet gear parallel with at least one other input planet gear on a radial plane perpendicular to the axis of rotation when the planetary gear system is subjected to high external loads.

15. A method of using the gear contact system of claim 1, wherein radial, thrust, and moment loads are stabilized.

* * * * *

UNITED STATES PATENT AND TRADEMARK OFFICE
CERTIFICATE OF CORRECTION

Page 1 of 1

PATENT NO. : 10,174,810 B2
APPLICATION NO. : 14/779272
DATED : January 8, 2019
INVENTOR(S) : Elias Brassitos It is certified that error appears in the above-identified patent and that said Letters Patent is hereby corrected as shown below:

In the Specification

In Column 1, before "Statement of Incorporation by Reference" please add "This invention was made with government support under Grant Number 1343434 awarded by the National Science Foundation. The government has certain rights in the invention."

Signed and Sealed this
Twenty-seventh Day of October, 2020

Andrei Iancu
*Director of the United States Patent and Trademark Office*